(12) United States Patent
Kashiwagi et al.

(10) Patent No.: US 8,212,433 B2
(45) Date of Patent: Jul. 3, 2012

(54) ELECTRET AND ELECTROSTATIC INDUCTION CONVERSION DEVICE

(75) Inventors: Kimiaki Kashiwagi, Tokyo (JP); Kuniko Okano, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/890,441

(22) Filed: Sep. 24, 2010

(65) Prior Publication Data
US 2011/0012438 A1 Jan. 20, 2011

Related U.S. Application Data

(63) Continuation of application No. PCT/JP2009/055979, filed on Mar. 25, 2009.

(30) Foreign Application Priority Data

Mar. 27, 2008 (JP) ................................. 2008-082532

(51) Int. Cl.
*G11C 99/00* (2006.01)
(52) U.S. Cl. ...................................................... 307/400
(58) Field of Classification Search .................... 307/400
See application file for complete search history.

(56) References Cited

U.S. PATENT DOCUMENTS

| | | | |
|---|---|---|---|
| 3,702,493 A | 11/1972 | Murphy | |
| 3,946,422 A | 3/1976 | Yagi et al. | |
| 4,250,415 A * | 2/1981 | Lewiner et al. | 307/400 |
| 4,291,245 A | 9/1981 | Nowlin et al. | |
| 4,441,038 A * | 4/1984 | Tanaka et al. | 307/400 |
| 4,442,324 A | 4/1984 | Blanchard et al. | |
| 4,443,711 A * | 4/1984 | Tanaka et al. | 307/400 |
| 4,513,049 A | 4/1985 | Yamasaki et al. | |
| 5,161,233 A * | 11/1992 | Matsuo et al. | 399/136 |
| 5,256,176 A | 10/1993 | Matsuura et al. | |
| 5,267,076 A * | 11/1993 | Broussoux et al. | 359/245 |

(Continued)

FOREIGN PATENT DOCUMENTS

EP 0 369 032 A1 5/1990

(Continued)

OTHER PUBLICATIONS

Notification of Transmittal of Translation of the International Preliminary Report on Patentability (IPRP) in PCT/JP2009/055979 dated Nov. 18, 2010.

(Continued)

*Primary Examiner* — Adi Amrany
(74) *Attorney, Agent, or Firm* — Foley & Lardner LLP

(57) ABSTRACT

An electret having a high surface charge density, is provided and along with an electrostatic induction conversion device including such an electret. In some embodiments, the electret includes a laminate having a layer (A) containing a polymer compound (a) having a relative dielectric constant of from 1.8 to 3.0 and a layer (B) containing a polymer compound (b) or inorganic substance (c) having a relative dielectric constant higher than the polymer compound (a). The difference between the relative dielectric constant of the polymer compound (b) or inorganic substance (c) and the relative dielectric constant of the polymer compound (a) is at least 0.3. The layer (A) is disposed on the outermost surface on a side opposite to the side where electric charge is injected at the time of injecting electric charge into the laminate to form the electret; and the layer (B) has a thickness of at least 1 μm.

13 Claims, 1 Drawing Sheet

U.S. PATENT DOCUMENTS

| | | | |
|---|---|---|---|
| 5,284,693 A | | 2/1994 | Spain et al. |
| 5,439,768 A | * | 8/1995 | Matsuo et al. ............... 430/56 |
| 5,558,809 A | | 9/1996 | Groh et al. |
| 5,610,455 A | | 3/1997 | Allen et al. |
| 5,638,103 A | * | 6/1997 | Obata et al. ............... 347/164 |
| 5,731,116 A | * | 3/1998 | Matsuo et al. ............... 430/56 |
| 5,759,205 A | | 6/1998 | Valentini |
| 5,787,327 A | | 7/1998 | Matsushita et al. |
| 5,981,123 A | * | 11/1999 | Matsuo et al. ............... 430/48 |
| 6,489,033 B1 | | 12/2002 | Hatke et al. |
| 6,493,013 B2 | * | 12/2002 | Obata et al. ............... 347/139 |
| 6,573,205 B1 | | 6/2003 | Myers et al. |
| 6,806,593 B2 | | 10/2004 | Tai et al. |
| 6,870,939 B2 | | 3/2005 | Chiang et al. |
| 6,893,990 B2 | | 5/2005 | Myers et al. |
| 7,449,811 B2 | * | 11/2008 | Suzuki et al. ............... 310/309 |
| 7,879,446 B2 | | 2/2011 | Liu et al. |
| 2002/0080684 A1 | | 6/2002 | Donskoy et al. |
| 2005/0009944 A1 | | 1/2005 | Apostolo et al. |
| 2005/0107555 A1 | | 5/2005 | Chiang et al. |
| 2006/0113862 A1 | | 6/2006 | Suzuki et al. |
| 2008/0111444 A1 | | 5/2008 | Mabuchi |
| 2008/0122313 A1 | | 5/2008 | Mabuchi et al. |
| 2009/0051242 A1 | * | 2/2009 | Suzuki et al. ............... 310/300 |
| 2009/0245547 A1 | | 10/2009 | Lee et al. |
| 2010/0127595 A1 | * | 5/2010 | Suzuki et al. ............... 310/300 |
| 2011/0012438 A1 | | 1/2011 | Kashiwagi et al. |
| 2011/0031845 A1 | * | 2/2011 | Kashiwagi et al. ......... 310/300 |

FOREIGN PATENT DOCUMENTS

| | | |
|---|---|---|
| EP | 0 460 523 A1 | 12/1991 |
| EP | 0 950 672 A1 | 10/1999 |
| EP | 0 969 023 A2 | 1/2000 |
| EP | 2 266 792 A1 | 12/2010 |
| GB | 2 079 056 A | 1/1982 |
| JP | 64-041865 A | 2/1989 |
| JP | 03-156375 A | 7/1991 |
| JP | 04-255716 A | 9/1992 |
| JP | 08-015302 A | 1/1996 |
| JP | 8-041260 | 2/1996 |
| JP | 08-155230 A | 6/1996 |
| JP | 2002-505034 | 2/2002 |
| JP | 2003-013359 A | 1/2003 |
| JP | 2004-059763 A | 2/2004 |
| JP | 2004-128361 | 4/2004 |
| JP | 2006-180450 | 7/2006 |
| JP | 2006-253847 A | 9/2006 |
| JP | 2006-329800 A | 12/2006 |
| JP | 2007-292743 A | 11/2007 |
| JP | 2007-312551 A | 11/2007 |
| JP | 2007-333618 A | 12/2007 |
| JP | 2008-010176 A | 1/2008 |
| JP | 2008-016919 A | 1/2008 |
| JP | 2008-028499 A | 2/2008 |
| JP | 2008-167231 A | 7/2008 |
| JP | 2008-266563 A | 11/2008 |
| JP | 2009-017769 A | 1/2009 |
| WO | WO-98/56836 | 12/1998 |
| WO | WO-2007/044921 A1 | 4/2007 |
| WO | WO-2008/114489 A1 | 9/2008 |
| WO | WO-2008/133088 A1 | 11/2008 |

OTHER PUBLICATIONS

International Search Report in PCT/JP2009/055979 dated Jun. 16, 2009.
G.M. Sessler, *Electrets* Third Edition, pp. 20, Chapter 2.2, "Charging and Polarizing Methods," (Laplacian Press, 1998), p. 25.
U.S. Appl. No. 13/049,833, filed Mar. 16, 2011, Kashiwagi et al.
U.S. Appl. No. 12/894,097, filed Sep. 29, 2010, Hamatani et al.
U.S. Appl. No. 12/805,234, filed Jul. 20, 2010, Kashiwagi.
U.S. Appl. No. 12/904,856, filed Oct. 14, 2010, Kashiwagi et al.
Arakawa et al., "Micro Seismic Power Generator Using Electret Polymer Film," The 9th National Symposium on Power and Energy Systems (SPES 2004), Jun. 22, 2004, pp. 37-38.
International Search Report received in PCT/JP2009/066181.
International Search Report received in PCT/JP2009/052932.
International Search Report received in PCT/JP2009/056175.
International Search Report received in PCT/JP2009/057656.
Supplementary European Search Report dated Aug. 2, 2011 in EP 09711771.7.
Supplementary European Search Report dated Jul. 27, 2011, in EP 09724065.9.
Supplementary European Search Report dated Jul. 28, 2011, in EP 09732621.9.

* cited by examiner

ELECTRET AND ELECTROSTATIC INDUCTION CONVERSION DEVICE

CROSS REFERENCE TO RELATED APPLICATIONS

The present application is a continuation of International Patent Application PCT/JP2009/055979 filed Mar. 25, 2009 which claims benefit of Japanese Patent Application No. 2008-082532, filed Mar. 27, 2008.

TECHNICAL FIELD

The present invention relates to an electret and an electrostatic induction conversion device comprising such an electret.

BACKGROUND ART

Heretofore, an electrostatic induction conversion device such as a power-generating unit or a microphone has been proposed wherein an electret having an electric charge injected to an insulating material, is used.

As the material for such an electret, it has been common to use a chain polymer such as polycarbonate, polypropylene or polytetrafluoroethylene. Further, recently, it has been proposed to use a polymer having a fluoroalicyclic structure in its main chain (e.g. Patent Document 1), or a cycloolefin polymer (e.g. Patent Documents 2 and 3), as the material for such an electret.

Patent Document 1: JP-A-2006-180450
Patent Document 2: JP-A-2002-505034
Patent Document 3: JP-A-8-41260

DISCLOSURE OF THE INVENTION

Object to be Accomplished by the Invention

With respect to an electret, further improvement in its surface charge density is desired in order to improve the conversion efficiency between electrical energy and kinetic energy in an electrostatic induction conversion device employing such an electret.

The present invention has been made in view of such a conventional problem, and it is an object of the present invention to provide an electret having a high surface charge density and an electrostatic induction conversion device comprising such an electret.

Means to Accomplish the Object

A first embodiment of the present invention to accomplish the above object is an electret comprising a laminate wherein a layer (A) containing a polymer compound (a) having a relative dielectric constant of from 1.8 to 3.0 and a layer (B) containing a polymer compound (b) or inorganic substance (c) having a relative dielectric constant higher than the polymer compound (a) are directly laminated, wherein the difference between the relative dielectric constant of the polymer compound (b) or inorganic substance (c) and the relative dielectric constant of the polymer compound (a) is at least 0.3; the layer (A) is disposed on the outermost surface on a side opposite to the side where electric charge is injected at the time of injecting electric charge into the laminate to form the electret; and the layer (B) has a thickness of at least 1 μm.

A second embodiment of the present invention is an electrostatic induction conversion device comprising the electret of the first embodiment.

Advantageous Effects of the Invention

According to the present invention, it is possible to provide an electret having a high surface voltage and a process for its production as well as an electrostatic induction conversion device comprising such an electret, whereby the conversion efficiency between electrical energy and kinetic energy is improved.

MEANINGS OF SYMBOLS

Figure 1:
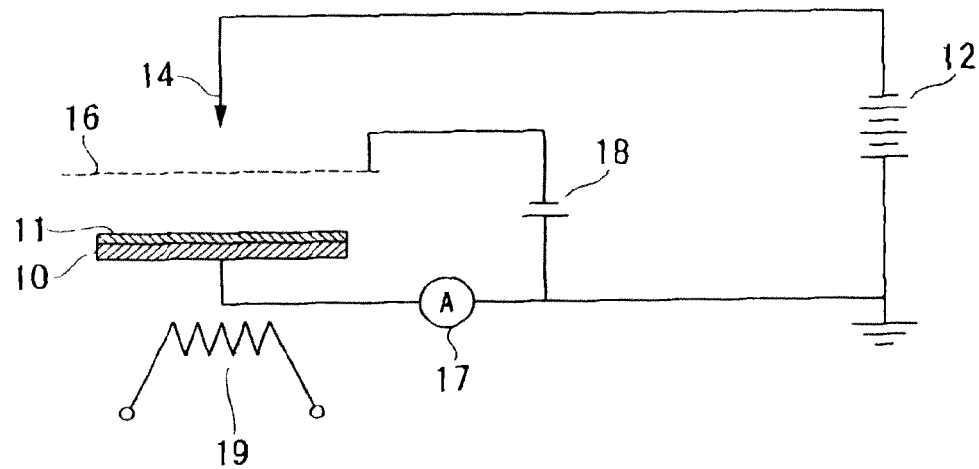
FIG. 1 is a schematic diagram illustrating a corona charging equipment used for injection of electric charge.

10: copper substrate, 11: laminate, 12: DC high-voltage power source, 14: corona needle, 16: grid, 17: ammeter, 18: power source for grid, 19: hot plate

BEST MODE FOR CARRYING OUT THE INVENTION

Now, the present invention will be described in further detail.

In the following specification, "repeating units" constituting a polymer may be referred to simply as "units".

Further, a unit represented by the formula (a1) may be referred to also as "a unit (a1)". A unit, compound or the like represented by another formula will be referred to in a similar manner, and for example, a monomer represented by the formula (1) may be referred to also as "a monomer (1)".

The electret of the present invention is characterized in that it comprises a laminate wherein the following layers (A) and (B) are directly laminated. In such a laminate, the layer (A) is disposed on the outermost surface on a side opposite to the side where electric charge is injected at the time of injecting electric charge into the laminate to form an electret.

Layer (A): a layer containing a polymer compound (a) having a relative dielectric constant of from 1.8 to 3.0.
Layer (B): a layer containing a polymer compound (b) or inorganic substance (c) having a relative dielectric constant higher by at least 0.3 than the relative dielectric constant of the polymer compound (a), and having a thickness of at least 1 μm.

The layer (A) is a portion which plays a role for charge retention as an electret.

The layer (B) is in contact directly with the layer (A) so as to contribute to the improvement of the surface charge density.

<Layer (A)>

The layer (A) is constituted by a polymer compound (a) having a relative dielectric constant of from 1.8 to 3.0. The relative dielectric constant is preferably from 1.8 to 2.7, more preferably from 1.8 to 2.3. When the relative dielectric constant is at least the lower limit within the above range, the amount of electric charge which can be stored as an electret will be high, and when it is lower than the upper limit, the electrical insulation property and the charge retention stability as an electret will be excellent.

Further, since the layer (A) is a portion which plays a role for charge retention as an electret, as the polymer compound (a), one having a high volume resistivity and a high dielectric breakdown strength is preferably employed.

The volume resistivity of the polymer compound (a) is preferably from $10^{10}$ to $10^{20}$ Ωcm, more preferably from $10^{16}$ to $10^{19}$ Ωcm. The volume resistivity is measured by ASTM D257.

Further, the dielectric breakdown strength of the polymer compound (a) is preferably from 10 to 25 kV/mm, more preferably from 15 to 22 kV/mm. The dielectric breakdown strength is measured by ASTM D149.

The polymer compound (a) is not particularly limited so long as the relative dielectric constant is within the above range. For example, it may optionally be selected from polymer compounds which have been used for electrets.

In the present invention, as the polymer compound (a), one having an alicyclic structure is preferred, since it is excellent in the charge retention performance.

The "alicyclic structure" means a cyclic structure having no aromatic nature. The alicyclic structure may, for example, be a saturated or unsaturated hydrocarbon cyclic structure which may have a substituent, a heterocyclic structure having some of carbon atoms in such a hydrocarbon cyclic structure substituted by hetero atoms such as oxygen atoms or nitrogen atoms, or a fluorinated alicyclic structure having hydrogen atoms in such a hydrocarbon cyclic structure or heterocyclic structure substituted by fluorine atoms.

The polymer compound having such an alicyclic structure may, for example, be a cycloolefin polymer.

The "cycloolefin polymer" is a polymer having an aliphatic hydrocarbon cyclic structure in the main chain of the polymer and is meant for one wherein at least two among carbon atoms constituting such an aliphatic hydrocarbon cyclic structure are incorporated in the main chain of the polymer.

The cycloolefin polymer has a unit having an aliphatic hydrocarbon cyclic structure (hereinafter sometimes referred to as a unit (a1)), and in such a unit (a1), at least two among carbon atoms constituting such an aliphatic hydrocarbon cyclic structure are incorporated in the main chain of the polymer. As the cycloolefin polymer, preferred may be one containing the following unit (a1-1):

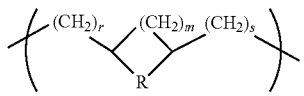
(a1-1)

wherein R is a bivalent hydrocarbon group which may have a substituent, m is an integer of from 0 to 10, r is an integer of 0 or 1, and s is an integer of 0 or 1.

In the formula (a1-1), the hydrocarbon group for R "may have a substituent", which means that some or all of hydrogen atoms in the hydrocarbon group may be substituted by substituents.

Such a substituent may, for example, be an alkyl group, a cycloalkyl group, an alkoxy group, an aryl group such as a phenyl group, or a polycyclic aliphatic hydrocarbon group such as an adamantyl group.

The alkyl group as such a substituent may be linear or branched and has preferably from 1 to 10, more preferably from 1 to 3, carbon atoms. Such an alkyl group is preferably a methyl group, an ethyl group, a propyl group or an isopropyl group, particularly preferably a methyl group or an ethyl group.

The cycloalkyl group as such a substituent has preferably from 3 to 10, more preferably from 5 to 8, carbon atoms. Such a cycloalkyl group is particularly preferably a cyclopentyl group or a cyclohexyl group.

The alkoxy group as such a substituent may, for example, be one having an oxygen atom (—O—) bonded to the above alkyl group.

The hydrocarbon group for R may be in a chain form or cyclic. Further, such a hydrocarbon group may be saturated or unsaturated, preferably saturated.

The chain form hydrocarbon group is preferably a linear alkylene group which may have a substituent, and it has preferably from 1 to 4, more preferably from 2 to 3, most preferably 2, carbon atoms. Specifically, a dimethylene group may be mentioned.

The cyclic hydrocarbon group is preferably a group having two hydrogen atoms removed from a monocyclic or polycyclic cycloalkane which may have a substituent. The monocyclic cycloalkane may, for example, be cyclopentane or cyclohexane. The polycyclic cycloalkane may, for example, be norbornane or adamantane. Among them, cyclopentane or norbornane is preferred.

In the formula (a1-1), m is an integer of from 0 to 10.

In a case where m is an integer of at least 1, as in the after-mentioned unit (a1-11), the polymer main chain is bonded not at the o-position but with a space or at least one methylene chain, of the aliphatic hydrocarbon cyclic structure, so that the aliphatic hydrocarbon cyclic structure is incorporated in the polymer main chain. In such a case, m is preferably an integer of from 1 to 3, most preferably 1.

When m is 0, as shown in the after-mentioned unit (a1-21), the polymer main chain is bonded at the o-position of the aliphatic hydrocarbon cyclic structure, so that the aliphatic hydrocarbon cyclic structure is incorporated in the polymer main chain.

Each of r and s may be 0 or 1.

Particularly when m is 0, r and s are preferably 0. Further, when m is 1, r and s are preferably 1.

As the unit (a1-1), preferred may, for example, be the following unit (a1-11) or unit (a1-21).

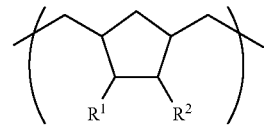
(a1-11)

wherein each of $R^1$ and $R^2$ which are independent of each other, is a hydrogen atom, an alkyl group or a cycloalkyl group, and $R^1$ and $R^2$ may be bonded to each other to form a ring.

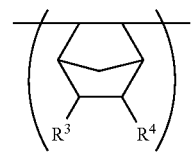
(a1-21)

wherein each of $R^3$ and $R^4$ which are independent of each other, is a hydrogen atom, an alkyl group or a cycloalkyl group, or $R^3$ and $R^4$ may be bonded to each other to form a ring.

In the formula (a1-11), the alkyl group or the cycloalkyl group for $R^1$ or $R^2$ may, respectively, be the same one as the alkyl group or the cycloalkyl group mentioned as the above substituent.

$R^1$ and $R^2$ may be bonded to each other to form a ring together with the carbon atoms to which $R^1$ and $R^2$ are respectively bonded. In such a case, the ring to be formed is preferably a monocyclic or polycyclic cycloalkane. The monocyclic cycloalkane may, for example, be cyclopentane or cyclohexane. The polycyclic cycloalkane may, for example, be norbornane or adamantane. Among them, cyclopentane or norbornane is preferred.

Such a ring may have a substituent. The substituent may, for example, be the same one as the substituent which the above-mentioned hydrocarbon group for R may have.

Specific examples of the unit (a1-11) in a case where $R^1$ and $R^2$ form a ring, include the following units (a1-11-1) and (a1-12-1).

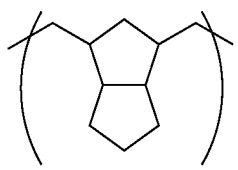
(a1-11-1)

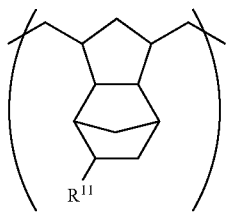
(a1-12-1)

wherein $R^{11}$ is a hydrogen atom or an alkyl group.

The alkyl group for $R^{11}$ may, for example, be the same one as the alkyl group mentioned as the substituent which the above-mentioned hydrocarbon group for R may have, and particularly preferred is a methyl group.

In the present invention, the unit (a1-11) is preferably one wherein $R^1$ and $R^2$ form a ring, or one wherein at least one of $R^1$ and $R^2$ is a cycloalkyl group.

In the formula (a1-21), $R^3$ and $R^4$ are, respectively, the same as the above $R^1$ and $R^2$.

Specific examples of the unit (a1-21) in a case where $R^3$ and $R^4$ form a ring, include the following units (a1-21-1) and (a1-21-2).

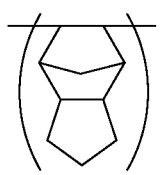
(a1-21-1)

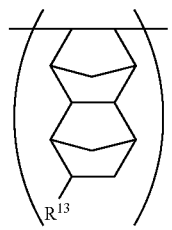
(a1-21-2)

wherein $R^{13}$ is a hydrogen atom or an alkyl group.

The alkyl group for $R^{13}$ may, for example, be the same one as the alkyl group mentioned as the substituent which the above-mentioned hydrocarbon group for R may have, and particularly preferred is a methyl group.

The cycloolefin polymer may contain one or more types among the above-described units, as the unit (a1).

The proportion of the unit (a1) in the cycloolefin polymer is preferably at least 30 mol %, more preferably at least 40 mol %, or may be 100 mol %, based on the total of all repeating units constituting the cycloolefin polymer.

The cycloolefin polymer may contain a unit other than the unit (a1) (hereinafter sometimes referred to as a unit (a2)).

As the unit (a2), an optional unit which has been used for a cycloolefin polymer, may be used without any particular limitation.

As such a unit (a2), a unit based on an olefin which may have a substituent, is preferred, and as such a unit, the following unit (a2-1) may, for example, be mentioned.

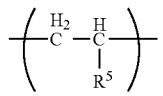
(a2-1)

wherein $R^5$ is a hydrogen atom or an alkyl group.

In the formula, the alkyl group for $R^5$ may be the same one as the alkyl group mentioned as the substituent which the above-mentioned hydrocarbon group for R may have.

The cycloolefin polymer to be used in the present invention is particularly preferably the following cycloolefin polymer (I) or cycloolefin polymer (II).

Cycloolefin polymer (I): a cycloolefin polymer containing the above unit (a1-11).

Cycloolefin polymer (II): a cycloolefin polymer containing the above unit (a1-21) and the unit (a2).

The cycloolefin polymer (I) may contain one or more types as the unit (a1-11).

Further, the cycloolefin polymer (I) may contain a unit other than the unit (a1-11) within a range not to impair the effects of the present invention. In the cycloolefin polymer (I), the proportion of the unit (a1-11) is preferably at least 80 mol %, more preferably at least 90 mol %, particularly preferably 100 mol %, based on the total of all repeating units constituting the cycloolefin polymer (I). That is, as the cycloolefin polymer (I), a polymer composed solely of the unit (a1-11) is particularly preferred.

The cycloolefin polymer (II) may contain one or more types as each of the unit (a1-21) and the unit (a2).

Further, the cycloolefin polymer (II) may contain a unit other than the unit (a1-21) and the unit (a2) within a range not to impair the effects of the present invention.

In the cycloolefin polymer (II), the proportion of the unit (a1-21) is preferably from 20 to 70 mol %, more preferably from 30 to 50 mol %, based on the total of all repeating units constituting the cycloolefin polymer (II). Further, the proportion of the unit (a2) is preferably from 30 to 80 mol %, more preferably from 50 to 70 mol %, based on the total of all repeating units constituting the cycloolefin polymer (II).

Further, the content ratio (molar ratio) of the unit (a1-21) to the unit (a2) in the cycloolefin polymer (II) is preferably within a range of the unit (a1-21):the unit (a2)=20:80 to 70:30, more preferably within a range of 30:70 to 50:50.

Preferred specific examples of the cycloolefin polymer (II) include copolymers containing two types of the respective units as shown by the following formulae (II-1) and (II-2):

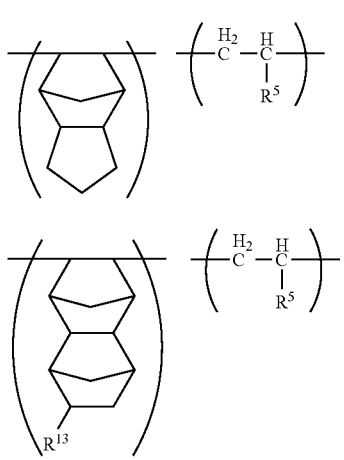

wherein $R^{13}$ and $R^5$ are, respectively, as defined above.

The cycloolefin polymer may have functional groups as terminal groups at the main chain terminals and/or side chain portions.

Such a functional group may, for example, be an alkoxy carbonyl group (which may be referred to also as an ester group), a carboxy group, a carboxylic acid halide group, an amide group, a hydroxy group, an amino group, a sulfonic acid group, a sulfonate group, a sulfonamide group, a thiol group or a cyano group. Among them, an alkoxy carbonyl group or a carboxy group is preferred.

In a case where a carboxy group is contained as a terminal group, a silane compound may be bonded to such a carboxy group.

The silane compound may be bonded to such a carboxy group, for example, by reacting a cycloolefin polymer having a carboxy group at a terminal group, with a silane coupling agent which will be described hereinafter.

A cycloolefin polymer having functional groups such as alkoxy carbonyl groups or carboxy groups as terminal groups, may, for example, be a modified polymer compound obtained by graft-copolymerizing a modified monomer composed of an unsaturated carboxylic acid and its derivative, to a cycloolefin polymer.

Such an unsaturated carboxylic acid may, for example, be acrylic acid, methacrylic acid, α-ethylacrylic acid, maleic acid, fumaric acid, itaconic acid, citraconic acid, nadic acid or methylnadic acid. The derivative of such an unsaturated carboxylic acid may, for example, be an acid halide, amide, imide, acid anhydride or ester, of the above unsaturated carboxylic acid. Specifically, malenyl chloride, maleic anhydride, citraconic anhydride, methyl maleate or dimethyl maleate may, for example, be mentioned.

The cycloolefin polymer is not particularly limited so long as it is one which satisfies the desired characteristics such as the relative dielectric constant. A commercially available one may be employed, or it may the synthesized.

As methods for the synthesis of the cycloolefin polymer, the following (1) to (7) are, for example, known.

Here, the represented unit in the final product in each reaction formula shows a unit contained in the obtained cycloolefin polymer.

(1) A method wherein a norbornene and an olefin are subjected to addition copolymerization (e.g. a method shown by the following reaction formula (1')).

(2) A method wherein a ring opened metathesis polymer of a norbornene is subjected to hydrogenation (e.g. a method shown by the following reaction formula (2'))

(3) A method wherein an alkylidene norbornene is subjected to transannular polymerization (e.g. a method shown by the following reaction formula (3')).

(4) A method wherein a norbornene is subjected to addition polymerization (e.g. a method shown by the following reaction formula (4')).

(5) A method wherein 1,2- and 1,4-addition polymers of cyclopentadiene are subjected to hydrogenation (e.g. a method shown by the following reaction formula (6)).

(6) A method wherein 1,2- and 1,4-addition polymers of cyclohexadiene are subjected to hydrogenation (e.g. a method shown by the following reaction formula (6')).

(7) A method wherein a conjugated diene is subjected to cyclopolymerization (e.g. a method shown by the following reaction formula (7')).

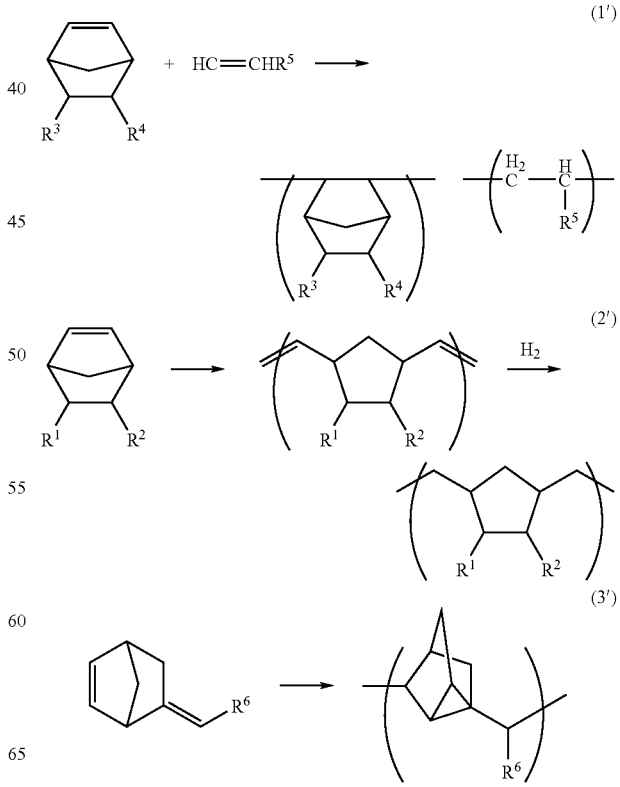

-continued

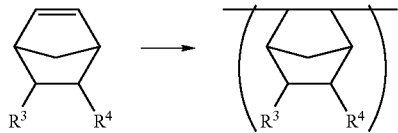
(4')

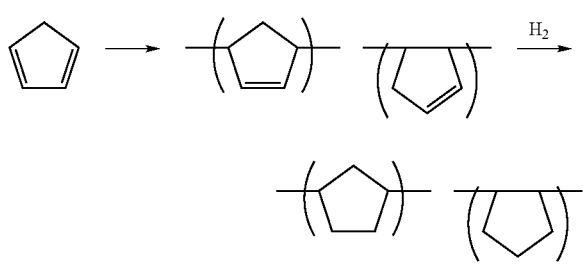
(5')

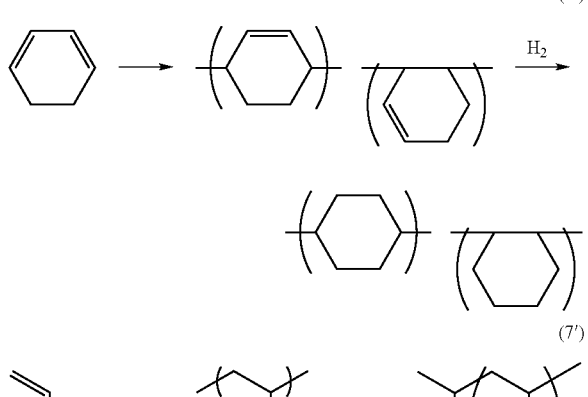
(6')

(7')

In each reaction formula, $R^1$ to $R^5$ are as defined above.

Each of $R^6$ and $R^7$ which are independent of each other, is an alkyl group, and such an alkyl group may be the same one as the alkyl group mentioned as a substituent which the above-mentioned hydrocarbon group for R may have.

Among them, preferred are a cycloolefin polymer obtainable by the method (1) (an addition copolymer of a norbornene and an olefin) and a cycloolefin polymer obtainable by the method (2) (a hydrogenated polymer of a ring opened metathesis polymer of a norbornene) in view of the excellent film-forming property and efficiency in their syntheses.

The addition copolymer of a norbornene may, for example, be one commercially available under a tradename of APEL (registered trademark) (manufactured by Mitsui Chemicals Inc.) or TOPAS (registered trademark) (manufactured by Ticona).

As the hydrogenated polymer of a ring-opened metathesis polymer of a norbornene, various ones are available, but polymers commercially available under tradenames of ZEONEX (registered trademark) (manufactured by ZEON CORPORATION), ZEONOR (registered trademark) (manufactured by ZEON CORPORATION) and ARTON (registered trademark) (manufactured by JSR Corporation) are preferred since they have transparency, low moisture absorption and heat resistance.

Further, as a preferred polymer compound (a), a fluororesin may be mentioned. The fluororesin is excellent in electrical insulation properties and also excellent in charge retention performance as an electret. As such a fluororesin, particularly preferred is a fluororesin having an alicyclic structure (e.g. the after-mentioned fluorinated cyclic polymer).

The fluororesin to be used as the polymer compound (a) may specifically be, for example, a polytetrafluoroethylene, an ethylene/tetrafluoroethylene copolymer (ETFE), a tetrafluoroethylene/perfluoro(alkyl vinyl ether) copolymer (PFA), a fluoroolefin/alkyl vinyl ether copolymer or a fluorinated cyclic polymer. Among them, from the viewpoint of electrical insulation properties, at least one member selected from the group consisting of a polytetrafluoroethylene, a tetrafluoroethylene/perfluoro(alkyl vinyl ether) copolymer (PFA) and a fluorinated cyclic polymer, is preferred, and a fluorinated cyclic polymer is particularly preferred.

The "fluorinated cyclic polymer" is a fluoropolymer having a fluorinated alicyclic structure in the main chain and is meant for one wherein at least one of carbon atoms constituting the fluorinated alicyclic structure is a carbon atom constituting the main chain of the fluoropolymer.

Among carbon atoms constituting the fluorinated alicyclic structure, a carbon atom constituting the main chain is derived from the polymerizable double bond of a monomer constituting the fluoropolymer.

For example, in a case where the fluoropolymer is a fluoropolymer obtained by polymerizing a cyclic monomer as described hereinafter, two carbon atoms constituting the double bond become the carbon atoms constituting the main chain.

Further, in the case of a fluoropolymer obtained by cyclopolymerizing a monomer having two polymerizable double bonds, at least two among the four carbon atoms constituting the two polymerizable double bonds become the carbon atoms constituting the main chain.

The fluorinated alicyclic structure may be one wherein the cyclic skeleton is constituted solely by carbon atoms, or a heterocyclic structure wherein a hetero atom such as an oxygen atom or a nitrogen atom is contained in addition to the carbon atoms. The fluorinated alicyclic ring is preferably a fluorinated alicyclic ring having one or two etheric oxygen atoms in the cyclic skeleton.

The number of atoms constituting the cyclic skeleton of the fluorinated alicyclic structure is preferably from 4 to 7, more preferably from 5 to 6. That is, the fluorinated alicyclic structure is preferably a 4- to 7-membered ring, more preferably a 5- or 6-membered ring.

As a preferred fluorinated cyclic polymer, the following fluorinated cyclic polymer (I') or fluorinated cyclic polymer (II') may be mentioned.

Fluorinated cyclic polymer (I'): a polymer having a unit based on a cyclic fluorinated monomer.

Fluorinated cyclic polymer (II'): a polymer having a unit formed by cyclopolymerization of a diene type fluorinated monomer.

The "cyclic fluorinated monomer" is a monomer having a polymerizable double bond between carbon atoms constituting a fluorinated alicyclic ring, or a monomer having a polymerizable double bond between a carbon atom constituting a fluorinated alicyclic ring and a carbon atom of other than a fluorinated alicyclic ring.

Such a cyclic fluoromonomer is preferably a compound (1) or a compound (2).

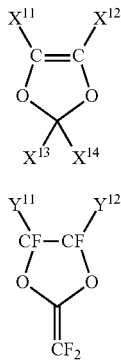

(1)

(2)

In the above formulae, each of $X^{11}$, $X^{12}$, $X^{13}$, $X^{14}$, $Y^{11}$ and $Y^{12}$ which are independent of one another, is a fluorine atom, a perfluoroalkyl group or a perfluoroalkoxy group.

The perfluoroalkyl group for $X^{11}$, $X^{12}$, $X^{13}$, $X^{14}$, $Y^{11}$ and $Y^{12}$ has preferably from 1 to 7, more preferably from 1 to 4, carbon atoms. Such a perfluoroalkyl group is preferably linear or branched, more preferably linear. Specifically, it may, for example, be a trifluoromethyl group, a pentafluoroethyl group or a heptafluoropropyl group, and particularly preferred is a trifluoromethyl group.

The perfluoroalkoxy group for $X^{12}$, $X^{13}$, $X^{14}$, $Y^{11}$ and $Y^{12}$ may, for example, be one having an oxygen atom (—O—) bonded to the above perfluoroalkyl group.

$X^{11}$ is preferably a fluorine atom.

$X^{12}$ is preferably a fluorine atom, a trifluoromethyl group or a $C_{1-4}$ perfluoroalkoxy group, more preferably a fluorine atom or a trifluoromethoxy group.

Each of $X^{13}$ and $X^{14}$ which are independent of each other, is preferably a fluorine atom or a $C_{1-4}$ perfluoroalkyl group, more preferably a fluorine atom or a trifluoromethyl group.

Each of $Y^{11}$ and $Y^{12}$ which are independent of each other, is preferably a fluorine atom, a $C_{1-4}$ perfluoroalkyl group or a $C_{1-4}$ perfluoroalkoxy group, more preferably a fluorine atom or a trifluoromethyl group.

In the compound (1), $X^{13}$ and $X^{14}$ may be bonded to each other to form a fluorinated alicyclic ring together with the carbon atoms to which $X^{13}$ and $X^{14}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

In the compound (2), $Y^{11}$ and $Y^{12}$ may be bonded to each other to form a fluorinated alicyclic ring together with the carbon atoms to which $Y^{11}$ and $Y^{12}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

Preferred specific examples of the compound (1) include compounds (1-1) to (1-5).

Specific examples of the compound (2) include compounds (2-1) and (2-3).

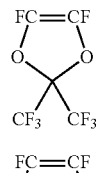

(1-1)

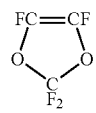

(1-2)

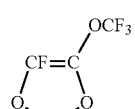

(1-3)

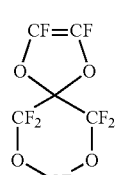

(1-4)

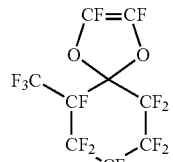

(1-5)

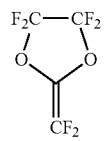

(2-1)

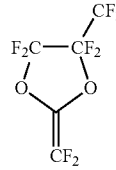

(2-2)

The fluorinated cyclic polymer (I') may be a homopolymer of the above cyclic fluorinated monomer, or may be a copolymer of such a cyclic fluorinated monomer with another monomer.

However, in such a fluorinated cyclic polymer (I'), the proportion of the unit based on the cyclic fluorinated monomer is preferably at least 20 mol %, more preferably at least 40 mol %, or may be 100 mol %, based on the total of all repeating units constituting the fluorinated cyclic polymer (I').

Said another monomer may be one copolymerizable with the above cyclic fluorinated monomer and is not particularly limited. Specifically, the after-mentioned diene-type fluorinated monomer, tetrafluoroethylene, chlorotrifluoroethylene or perfluoro(methyl vinyl ether) may, for example, be mentioned.

The "diene-type fluorinated monomer" is a monomer having two polymerizable double bonds and fluorine atoms. Such polymerizable double bonds are not particularly limited, but preferably vinyl groups, allyl groups, acryloyl groups or methacryloyl groups.

The diene-type fluorinated monomer is preferably a compound (3).

$$CF_2=CF-Q-CF=CF_2 \quad (3)$$

In the formula, Q is a $C_{1-3}$ perfluoroalkylene group which may have an etheric oxygen atom and wherein some of fluorine atoms may be substituted by halogen atoms other than fluorine atoms. Such halogen atoms other than fluorine atoms may, for example, be chlorine atoms or bromine atoms.

In a case where Q is a perfluoroalkylene group having an etheric oxygen atom, the etheric oxygen atom in the perfluoroalkylene group may be present at one terminal of the group or may be present at both terminals of the group, or may be present between carbon atoms of the group. From the viewpoint of the cyclopolymerizability, it is preferably present at one terminal of the group.

As the unit to be formed by cyclopolymerization of the compound (3), repeating units of the following formulae (3-1) to (3-4) may be mentioned.

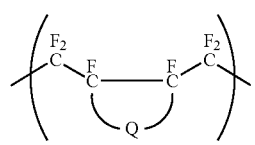

(3-1)

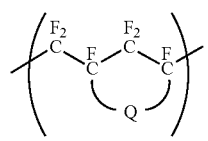

(3-2)

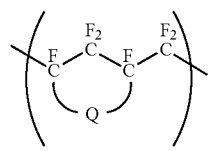

(3-3)

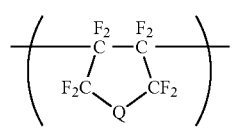

(3-4)

The following compounds may be mentioned as specific examples of the compound (3).

$CF_2=CFOCF_2CF=CF_2$,
$CF_2=CFOCF(CF_3)CF=CF_2$,
$CF_2=CFOCF_2CF_2CF=CF_2$,
$CF_2=CFOCF_2CF(CF_3)CF=CF_2$,
$CF_2=CFOCF(CF_3)CF_2CF=CF_2$,
$CF_2=CFOCFClCF_2CF=CF_2$,
$CF_2=CFOCCl_2CF_2CF=CF_2$,
$CF_2=CFOCF_2OCF=CF_2$,
$CF_2=CFOC(CF_3)_2OCF=CF_2$,
$CF_2=CFOCF_2CF(OCF_3)CF=CF_2$,
$CF_2=CFCF_2CF=CF_2$,
$CF_2=CFCF_2CF_2CF=CF_2$,
$CF_2=CFCF_2OCF_2CF=CF_2$, etc.

The fluorinated cyclic polymer (II') may be constituted solely by a unit formed by cyclopolymerization of the above diene-type fluoromonomer, or may be a copolymer of such a unit with another unit.

However, in such a fluorinated cyclic polymer (II'), the proportion of the unit formed by cyclopolymerization of the diene-type fluorinated monomer is preferably at least 50 mol %, more preferably at least 80 mol %, most preferably 100 mol %, based on the total of all repeating units constituting the fluorinated cyclic polymer (II').

Said another monomer may be one copolymerizable with the above diene-type fluorinated monomer and is not particularly limited. Specifically, a cyclic fluorinated monomer such as the above-mentioned compound (1) or (2), tetrafluoroethylene, chlorotrifluoroethylene, or perfluoro(methyl vinyl ether) may, for example, be mentioned.

The weight average molecular weight of the polymer compound (a) is preferably from 3,000 to 1,000,000, more preferably from 10,000 to 300,000.

Further, the polymer compound (a) preferably has a glass transition temperature of at least 80° C., more preferably at least 100° C. When the glass transition temperature is at least 100° C., the electret will be excellent in heat resistance, stability of maintained charge. Further, such a glass transition temperature is preferably at most 350° C., more preferably at most 250° C., most preferably at most 200° C., in consideration of e.g. the film-forming property at the time of forming the polymer compound (a) into a film or the solubility of the polymer compound (a) in a solvent.

The glass transition temperature of the polymer compound (a) can be adjusted by adjusting the types or proportions of the repeating units constituting the polymer compound (a). For example, in the case of the above fluorinated cyclic polymer, the repeating units based on the above compound (1) or (2) contribute to an improvement of the glass transition temperature of the polymer, and the larger the proportion of such units, the higher the glass transition temperature.

As the fluororesin, one satisfying the desired properties such as the above relative dielectric constant may suitably be selected from commercial products, or may be synthesized by a usual method.

For example, a fluorinated cyclic polymer may be produced by carrying out e.g. cyclopolymerization, homopolymerization or copolymerization of monomers for the respective units by applying a conventional method disclosed in e.g. JP-A-4-189880.

Further, as commercial products of the fluorinated cyclic polymer, CYTOP (registered trademark) (manufactured by Asahi Glass Company, Limited), Teflon (registered trademark) AF (manufactured by Du Pont) and HYFLON (registered trademark) AD (manufactured by Solvey Solexis) may, for example, be mentioned.

A method for forming the layer (A) is not particularly limited. However, as a preferred method, a method may, for example, be mentioned wherein the polymer compound (a) is dissolved in a solvent to prepare a coating composition, and by using such a coating composition, a coating film is formed.

Such forming of a coating film may be carried out, for example, by coating a substrate or the surface of the layer (B) with the coating composition, followed by drying by e.g. baking. As the coating method, a conventional method for forming a film from a solution may be used without any particular limitation. Specific examples of such a method include, for example, a roll coater method, a casting method, a dipping method, a spin coating method, a casting-on-water method, a Lanmuir•Blodgett method, a die coating method, an inkjet method and a spray coating method. Otherwise, it is possible to employ a printing technique such as a relief printing method, a gravure printing method, a lithography method, a screen printing method or a flexo printing method.

A solvent for the coating composition is not particularly limited so long as it is one capable of dissolving the polymer compound (a) and forming a coating film having a desired thickness and uniformity by a desired coating method, and it may, for example, be a protic solvent or an aprotic solvent.

The protic solvent may, for example, be methanol, ethanol, 1-propanol, isopropyl alcohol, 1-butanol, 2-butanol, t-butanol, pentanol, hexanol, 1-octanol, 2-octanol, ethylene glycol, ethylene glycol monomethyl ether, propylene glycol monomethyl ether, propylene glycol monobutyl ether, propylene glycol, methyl lactate or the after-mentioned protic fluorinated solvent.

The aprotic solvent may, for example, be hexane, cyclohexane, heptane, octane, decane, dodecane, decalin, acetone, cyclohexanone, 2-butanone, dimethoxyethane, monomethyl ether, ethyl acetate, butyl acetate, diglyme, triglyme, propylene glycol monomethyl ether monoacetate (PGMEA), N,N-dimethylformamide (DMF), N,N-dimethylacetamide (DMA), N-methylpyrrolidone, tetrahydrofuran, anisole, dichloromethane, dichloroethane, chloroform, carbon tetrachloride, chlorobenzene, dichlorobenzene, benzene, toluene, xylene, ethylbenzene, mesitylene, tetralin, methylnaphthalene, or the after-mentioned aprotic fluorinated solvent.

These solvents may be used alone or in combination as a mixture of two or more of them. Further, a wide range of compounds may be used other than these solvents.

Among them, in a case where a cycloolefin polymer is used as the polymer compound (a), as the solvent, an aprotic solvent is preferred, a hydrocarbon is more preferred, an aromatic hydrocarbon such as benzene, toluene, xylene, ethylbenzene, mesitylene, tetralin or methylnaphthalene is further preferred, and toluene or xylene is particularly preferred.

Further, in a case where a fluororesin is used as the polymer compound (a), as the solvent, an aprotic solvent is preferred, and an aprotic fluorinated solvent is more preferred.

As the aprotic fluorinated solvent, preferred may, for example, be the following fluorinated compounds.

A fluorinated aromatic compound such as hexafluorometh-axylylene, fluorobenzene, difluorobenzene, perfluorobenzene, pentafluorobenzene, 1,3-bis(trifluoromethyl)benzene or 1,4-bis(trifluoromethyl)benzene; a perfluorotrialkylamine compound such as perfluorotributylamine or perfluorotripropylamine; a perfluorocycloalkane compound such as perfluorodecalin, perfluorocyclohexane or perfluoro(1,3,5-trimethylcyclohexane); a perfluorocyclic ether compound such as perfluoro(2-butyltetrahydrofuran); a low molecular weight perfluoropolyether; a perfluoroalkane such as perfluorohexane, perfluorooctane, perfluorodecane, perfluorododecane, perfluoro(2,7-dimethyloctane), perfluoro(1,2-dimethylhexane) or perfluoro(1,3-dimethylhexane); a chlorofluorocarbon such as 1,1,2-trichloro-1,2,2,-trifluoroethane, 1,1,1-trichloro-2,2,2-trifluoroethane, 1,3-dichloro-1,1,2,2,3-pentafluoropropane, 1,1,1,3-tetrachloro-2,2,3,3-tetrafluoropropane or 1,1,3,4-tetrachloro-1,2,2,3,4,4-hexafluorobutane; a hydrofluorocarbon such as 1,1,1,2,2,3,3,5,5,5-decafluoropentane, 1,1,1,2,2,3,3,4,4,5,5,6,6-tridecafluorohexane, 1,1,1,2,2,3,3,4,4,5,5,6,6,7,7,8,8-heptadecafluorooctane, 1,1,1,2,2,3,3,4,4,5,5,6,6,7,7,8,8,9,9,10,10-henicosafluorodecane, 1,1,1,2,2,3,3,4,4-nonafluorohexane, 1,1,1,2,2,3,3,4,4,5,5,6,6-tridecafluorooctane, 1,1,1,2,2,3,3,4,4,5,5,6,6,7,7,8,8-heptadecafluorodecane, 1,1,1,2,3,4,5,5,5-nonafluoro-4-(trifluoromethyl)pentane or 1,1,1,2,2,3,5,5,5-nonafluoro-4-(trifluoromethyl)pentane; and a hydrochlorofluorocarbon such as 3,3-dichloro-1,1,1,2,2-pentafluoropropane or 1,3-dichloro-1,1,2,2,3-pentafluoropropane.

These fluorinated compounds may be used alone or in combination as a mixture of two or more of them.

Further, a wide range of aprotic fluorinated solvents other than the above may, also be used.

For example, a fluorinated solvent such as hydrofluoroether (HFE) is preferred. Such a fluorinated solvent is a fluorinated solvent (hereinafter sometimes referred to as a fluorinated solvent (2)) represented by the general formula $R^1$—O—$R^2$ (wherein $R^1$ is a $C_{5-12}$ linear or branched polyfluoroalkyl group which may have an etheric oxygen atom, and $R^2$ is a $C_{1-5}$ linear or branched alkyl group or a polyfluoroalkyl group).

The polyfluoroalkyl group for $R^1$ is a group wherein at least two hydrogen atoms in an alkyl group are substituted by fluorine atoms and includes a perfluoroalkyl group wherein all hydrogen atoms in an alkyl group are substituted by fluorine atoms and a group wherein at least two hydrogen atoms in an alkyl group are substituted by fluorine atoms and at least one hydrogen atom in the alkyl group is substituted by a halogen atom other than a fluorine atom. The halogen atom other than a fluorine atom is preferably a chlorine atom.

The polyfluoroalkyl group is preferably a group wherein at least 60%, more preferably at least 80%, by number of hydrogen atoms in the corresponding alkyl group are substituted by fluorine atoms. A more preferred polyfluoroalkyl group is a perfluoroalkyl group.

In a case where $R^1$ has an etheric oxygen atom, if the number of etheric oxygen atoms is too large, the solubility will be impaired, and therefore, the number of etheric oxygen atoms in $R^1$ is preferably from 1 to 3, more preferably from 1 to 2.

When the number of carbon atoms in $R^1$ is at least 5, the solubility of the fluorinated polymer will be good, and when the number of carbon atoms in $R^1$ is at most 12, such a polymer is readily industrially available. Accordingly, the number of carbon atoms in $R^1$ is selected within a range of from 5 to 12. The number of carbon atoms in $R^1$ is preferably from 6 to 10, more preferably from 6 to 7 and from 9 to 10.

The number of carbon atoms in $R^2$ is from 1 to 5, and when the number of carbon atoms is at most 5, the solubility of the fluorinated polymer will be good. A preferred example of $R^2$ is a methyl group or an ethyl group.

The molecular weight of the fluorinated solvent (2) is preferably at most 1,000, since if it is too large, not only the viscosity of the fluorinated polymer composition is likely to increase but also the solubility of the fluorinated polymer decreases.

Further, the fluorine content of the fluorinated solvent (2) is preferably from 60 to 80 mass %, whereby the fluorinated polymer will be excellent in solubility.

As preferred fluorinated solvents (2), the following may be exemplified.

$F(CF_2)_4OCH_3$, $CF_3CH_2OCF_2CF_2H$, $F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CFCF(OCH_3)CF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)_8OCH_2CH_2CH_3$, $(CF_3)_2CFCF_2CF_2OCH_3$, $F(CF_2)_2O(CF_2)_4OCH_2CH_3$.

Among such fluorinated solvents, particularly preferred is $(CF_3)_2CFCF(OCH_3)CF_2CF_3$.

To the above coating composition, a silane coupling agent may be incorporated, whereby a coating film formed by using such a fluoropolymer composition is excellent in the adhesion to the substrate.

The silane coupling agent is not particularly limited, and a wide range of silane coupling agents including known agents may be used. The following ones may specifically be exemplified.

A monoalkoxysilane such as trimethylmethoxysilane, trimethylethoxysilane, dimethylvinylmethoxysilane or dimethylvinylethoxysilane.

A dialkoxysilane such as γ-chloropropylmethyldimethoxysilane, γ-chloropropylmethyldimethoxysilane, γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-glycidyloxypropylmethyldimethoxysilane, γ-glycidyloxypropylmethyldiethoxysilane, γ-methacryloyloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8,8-tridecafluorooctylmethyldimethoxysilane or 3,3,4,4,5,5,6,6,7,7,8,8,9,9,10,10,10-heptadecafluorodecylmethyldimethoxysilane.

A tri- or tetra-alkoxysilane such as γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, γ-mercaptopropyltrimethoxysilane, γ-glycidyloxypropyltrimethoxysilane, γ-glycidyloxypropyltriethoxysilane, γ-methacryloyloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane or tetraethoxysilane.

Further, as a preferred silane coupling agent, an aromatic amine type silane coupling agent being a silane coupling agent having an aromatic amine structure may be mentioned. Compounds represented by the following formulae (s1) to (s3) may be mentioned as such aromatic amine type silane coupling agents.

$$ArSi(OR^{21})(OR^{22})(OR^{23}) \quad (s1)$$

$$ArSiR^{24}(OR^{21})(OR^{22}) \quad (s2)$$

$$ArSiR^{24}R^{25}(OR^{21}) \quad (s3)$$

wherein each of $R^{21}$ to $R^{25}$ which are independent of one another, is a hydrogen atom, a $C_{1-20}$ alkyl group or an aryl group, and Ar is a p-, m- or o-aminophenyl group.

As specific examples of the compounds represented by the formulae (s1) to (s3), the following ones may be mentioned.

Aminophenyltrimethoxysilane, aminophenyltriethoxysilane, aminophenyltripropoxysilane, aminophenyltriisopropoxysilane, aminophenylmethyldimethoxysilane, aminophenylmethyldiethoxysilane, aminophenylmethyldipropoxysilane, aminophenylmethyldiisopropoxysilane, aminophenylphenyldimethoxysilane, aminophenylphenyldiethoxysilane, aminophenylphenyldipropoxysilane, aminophenyldiisopropoxysilane, etc.

A hydrogen atom of an amino group in these compounds may be substituted by an alkyl group or an aryl group. For example, N,N-dimethylaminophenyltrialkoxysilane or N,N-dimethylaminophenylmethyldialkoxysilane may, for example, be mentioned. In addition, for example, aromatic amine type silane coupling agents disclosed in U.S. Pat. No. 3,481,815 may be used.

The above silane coupling agents may be used alone, or two or more of them may be used in combination.

Further, a partially hydrolyzed condensate of the above silane coupling agent may preferably be used.

Further, a co-partially hydrolyzed condensate of the above silane coupling agent with a tetraalkoxysilane such as tetramethoxysilane, tetraethoxysilane or tetrapropoxysilane, may also preferably be used. Among them, as one to improve the adhesion of the polymer compound (a) without impairing the electrical insulation properties of the polymer compound (a), a silane coupling agent having an amino group (such as γ-aminopropyltriethoxysilane, γ-aminoproplymethyldiethoxysilane, γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, aminophenyltrimethoxysilane, aminophenyltriethoxysilane, aminophenylmethyldimethoxysilane or aminophenylmethyldiethoxysilane) or a silane coupling agent having an epoxy group (such as γ-glycidyloxypropyltrimethoxysilane, γ-glycidyloxypropylmethyldimethoxysilane, γ-glycidyloxypropyltriethoxysilane or γ-glycidyloxypropylmethyldiethoxysilane) may be exemplified as a particularly preferred one.

In a case where as the polymer compound (a), one having a carboxy group preliminarily introduced to a side chain or at a terminal of the main chain, is used, an alkoxysilane having an amino group or an epoxy group is particularly effective as the silane coupling agent.

In a case where as the polymer compound (a), one having an alkoxy carbonyl group preliminarily introduced to a side chain or at a terminal of the main chain is used, an alkoxysilane having an amino group or an aminophenyl group is particularly effective as a silane coupling agent.

In a case where as a coating composition, an aprotic fluorinated solvent solution of a fluororesin is used, a protic fluorinated solvent may be incorporated to such a coating composition. When a protic fluorinated solvent is incorporated to the coating composition, it is possible to increase the solubility of the silane coupling agent in the coating composition. Further, it is possible to suppress an increase of the viscosity or gelation which is considered to be attributable to a reaction of the silane coupling agent itself.

That is, in an aprotic fluorinated solvent, the above-mentioned trialkoxysilane having an amino group or an epoxy group is likely to undergo gelation or viscosity increase with time, as compared with a dialkoxysilane having a similar group. Further, a trialkoxysilane has a smaller solubility in an aprotic fluorinated solvent solution of the coating composition, than the dialkoxysilane. Accordingly, in a case where as the coating composition, an aprotic fluorinated solvent solution is used, and a trialkoxysilane is incorporated thereto, it is preferred to further add a protic fluorinated solvent, particularly a fluorinated alcohol.

In a case where a dialkoxysilane is incorporated as a coupling agent, although the solubility is not so small as a trialkoxysilane, it is possible to improve the solubility by likewise adding a protic fluorinated solvent, particularly a fluorinated alcohol. In the case of the dialkoxysilane, the viscosity increase with time of the coating composition is not so remarkable as the trialkoxysilane, and accordingly, it is not necessarily required to add a protic fluorinated solvent such as a fluorinated alcohol. However, it is preferred to add such a protic fluorinated solvent, whereby the viscosity increase can certainly be suppressed.

As such a protic fluorinated solvent, the following ones may be exemplified.

A fluorinated alcohol such as trifluoroethanol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-(perfluoro-3-methylbutyl)ethanol, 2,2,3,3-tetrafluoro-1-propanol, 2,2,3,3,4,4,5,5-octafluoro-1-pentanol, 2,2,3,3,4,4,5,5,6,6,-dodecafluoro-1-heptanol, 2,2,3,3,4,4,5,5,6,6,7,7-hexadecafluoro-1-nonanol, 1,1,1,3,3,3-hexafluoro-2-propanol or 2,2,3,3,4,4-hexafluoro-1-butanol.

A fluorinated carboxylic acid such as trifluoroacetic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, 1,1,2,2-tetrafluoropropanoic acid, 1,1,2,2,3,3,4,4-octafluoropentanoic acid, 1,1,2,2,3,3,4,4,5,5-dodecafluoroheptanoic acid or 1,1,2,2,3,3,4,4,5,5,6,6-hexadecafluorononanoic acid, amides of these fluorinated carboxylic acids, or a fluorinated sulfonic acid such as trifluoromethanesulfonic acid or heptadecafluorooctanesulfonic acid.

These protic fluorinated solvents may be used alone, or two or more of them may be used in combination.

In a case where an aprotic fluorinated solvent and a protic fluorinated solvent are used in combination, the proportion of the protic fluorinated solvent based on the sum of the aprotic fluorinated solvent and the protic fluorinated solvent is preferably from 0.01 to 50 mass %, more preferably from 0.1 to 30 mass %.

The concentration of the polymer compound (a) in the coating composition may suitably be set depending upon the thickness of the layer (A) to be formed. It is usually from 0.1 to 30 mass %, preferably from 0.5 to 20 mass %.

Further, in a case where a silane coupling agent is incorporated to the coating composition, the amount is preferably from 0.01 to 50 parts by mass, more preferably from 0.1 to 30 parts by mass, per 100 parts by mass of the polymer compound (a).

<Layer (B)>

The layer (B) is a layer constituted by a polymer compound (b) or an inorganic substance (c), and the difference in the relative dielectric constant between the material constituting the layer (B) (the polymer compound (b) or the inorganic substance (c)) and the material constituting the layer (A) (the polymer compound (a)) is at least 0.3. The larger the difference in the relative dielectric constant, the better the effect to increase the surface charge density. Therefore, the difference in the relative dielectric constant is preferably at least 0.5, more preferably at least 0.8.

The upper limit of the difference in the relative dielectric constant is not particularly limited, but from the viewpoint of availability of the materials, efficiency for forming the laminate structure, etc., it is preferably 5.5, more preferably 4.0, further preferably 2.0.

The polymer compound (b) may be any so long as its relative dielectric constant is higher by at least 0.3 than the relative dielectric constant of the polymer compound (a), and it may suitably be selected from known polymer compounds taking into consideration the relative dielectric constant of the polymer compound (a) to be used for the layer (A), the above-described desired value of the difference in the relative dielectric constant, etc.

The relative dielectric constant of the polymer compound (b) may vary also depending upon the relative dielectric constant of the polymer compound (a), but is preferably from 2.5 to 8.0, more preferably from 2.5 to 5.0. When the relative dielectric constant is at least the lower limit within the above range, the surface charge density as an electret characteristic will be high, and when it is at most the upper limit, the charge retention stability as an electret will be excellent.

Specifically, the polymer compound (b) is preferably at least one member selected from the group consisting of a fluororesin, a polyimide, a polyparaxylylene resin, a polycarbonate, a polyarylene, a polyarylene ether, a polyether, a polyether sulfone, a polyether ketone, a polyether nitrile, a polyether imide, a polythioether sulfone, a polysulfone, nylon, a polyester, a polystyrene, a polyethylene, a polypropylene, a polyketone, an epoxy resin, an acrylic resin, a polyurethane, an aramid resin and a cycloolefin polymer. Among them, from the viewpoint of the relative dielectric constant, at least one member selected from the group consisting of a polyimide, a polyparaxylylene resin, a polycarbonate, a polyarylene, a polyarylene ether, a polysulfone and a polyether sulfone is preferred. Among them, as the fluororesin and the cycloolefin polymer, the same ones as the fluororesin and the cycloolefin polymer mentioned as examples for the above polymer compound (a) may, respectively, be exemplified. However, in a case where the fluororesin or the cycloolefin polymer is used as the polymer compound (b), one having a relative dielectric constant higher by at least 0.3 than the polymer compound (a) is used as such a fluororesin or a cycloolefin polymer.

Further, as a preferred fluororesin, the following "fluorinated aromatic resin containing a fluorinated aromatic polymer as the main component" may be mentioned.

The "fluorinated aromatic resin" is a resin containing a fluorinated aromatic polymer as the main component. The "fluorinated aromatic polymer" is a polymer having fluorine atoms and an aromatic ring in its molecule (a fluorinated polymer having an aromatic ring). The polymer being the main component of the resin means that the polymer occupies at least 50 mass % in the resin.

In the present invention, the proportion of the fluorinated aromatic polymer in the fluorinated aromatic resin is preferably at least 80 mass % and may be 100 mass %.

The fluorinated aromatic polymer contained in the fluorinated aromatic resin may be one type, or two or more types.

In this specification, the "aromatic ring" means a cyclic structure in a cyclic organic compound having an aromatic nature, and unless otherwise specified, it includes one having an optional substituent.

The aromatic ring which the fluorinated aromatic polymer has, may be a hydrocarbon ring comprising carbon atoms and hydrogen atoms, or a heterocyclic ring containing a heteroatom such as a nitrogen atom, an oxygen atom or a sulfur atom, or may be a mixture thereof.

The hydrocarbon ring may, for example, be benzene, naphthalene, anthracene, phenanthrene, tetracene or pentacene.

The hetero ring may, for example, be pyrrole, furan, thiophene, imidazole, oxazole, thiazole, pyrazole, isooxazole, isothiazole, pyridine, pyridazine, pyrimidine or pyrazine.

In the fluorinated aromatic polymer, a plurality of aromatic rings are preferably linked by a linking group. Here, the linking group may, for example, be a single bond, an alkylene group, an etheric oxygen atom (—O—), or an atomic group of e.g. sulfide, sulfone, carbonyl, ester or amide.

In the present invention, the fluorinated aromatic polymer preferably has a molecular structure in which fluorine atoms are directly bonded to an aromatic ring. That is, it preferably has an aromatic ring having fluorine atoms directly bonded (a fluorine atom-substituted aromatic ring) in its molecular structure.

In such a case, in the fluorinated aromatic polymer, fluorine atoms not bonded to the aromatic ring (bonded to chain-form carbon) may be present.

Further, in the fluorine atom-substituted aromatic ring, fluorine atoms may be bonded or may not be bonded to all carbon atoms constituting the fluorine atom-substituted aromatic ring. Further, fluorine atoms may be bonded or may not be bonded to all aromatic rings present in the fluorinated aromatic polymer.

As specific examples of the fluorinated aromatic polymer, a fluorinated aromatic polyimide, a fluorinated polybenzooxazole, a fluorinated polybenzoimidazole, a fluorinated polyphenylene sulfide, a fluorinated aromatic polysulfone, a fluorinated aromatic polyether sulfone, a fluorinated aromatic polyester, a fluorinated aromatic polycarbonate, a fluorinated aromatic polyamide imide, a fluorinated aromatic polyamide, a fluorinated aromatic polyether imide, a fluorinated polyarylene, a fluorinated polyphenylene oxide, a fluorinated aromatic polyether ether ketone and a fluorinated polyarylene ether may, for example, be exemplified.

Among them, a fluorinated aromatic polyimide, a fluorinated polybenzooxazole, a fluorinated aromatic polyether sulfone, a fluorinated aromatic polyether imide, a fluorinated polyarylene, a fluorinated aromatic polyether ether ketone and a fluorinated polyarylene ether are, for example, preferred since they have low relative dielectric constants and low moisture absorption and are excellent in electret properties.

Further, among the above, the fluorinated aromatic polymer is more preferably a fluorinated polyarylene and/or a fluorinated polyarylene ether. Particularly preferred is one wherein the main chain has a branched structure, since such a polymer is excellent in heat resistance.

In the present invention, the fluorinated polyarylene means a polyarylene having at least one fluorine atom in its structure, and the "polyarylene" means a polymer having a polyarylene structure in the main chain.

The "polyarylene structure" means a polymer structure wherein a structure having one or more aromatic rings is repeated, and "having a polyarylene structure in the main chain" means that in each aromatic ring constituting the polyarylene structure, at least two carbon atoms constituting the aromatic ring are carbon atoms in the carbon chain constituting the main chain.

In this specification, among carbon chains constituting the fluorinated polyarylene, a portion containing a polyarylene structure, or a portion containing "an aromatic ring wherein at least two carbon atoms are carbon atoms in the carbon chain" is regarded as a part of the main chain, and a terminal portion containing no such a structure is referred to as "a side chain".

The carbon chain constituting the main chain of the fluorinated polyarylene may be linear or branched. It is preferably branched from the viewpoint of the effects of the present invention.

The fluorinated polyarylene preferably has fluorine atoms which are directly bonded to an aromatic ring. That is, the fluorinated polyarylene preferably has a fluorine atom-substituted aromatic ring.

As such a fluorinated polyarylene, a polymer having a fluorinated aryl structural unit having one or more aromatic rings to which one or more fluorine atoms are bonded, may, for example, be preferably exemplified, since it has low moisture absorption and is excellent in the characteristics of the obtainable electret.

As such fluorinated aryl structural units, structural units represented by the following formulae (b1) to (b6) may, for example, be mentioned.

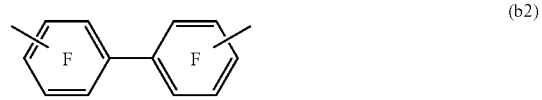

In this specification, F in an aromatic ring in each formula represents that all hydrogen atoms in the aromatic ring are substituted by fluorine atoms.

In such a fluorinated aryl structural unit, some of fluorine atoms bonded to the aromatic ring may be substituted by other atoms or substituents. Other atoms may, for example, be hydrogen atoms. The substituents may, for example, be $C_{1-8}$ fluorinated alkyl groups.

The fluorinated polyarylene may be one having one type of fluorinated aryl structural units, or one having two or more types of fluorinated aryl structural units.

The fluorinated polyarylene having one type of fluorinated aryl structural units may, for example, be a fluorinated polyphenylene, a fluorinated polybiphenylene or a fluorinated polynaphthanylene.

The fluorinated polyarylene having two or more fluorinated aryl structural units may, for example, be a polyarylene represented by the following formula (B1) (hereinafter referred to as a fluorinated polyarylene (B1)).

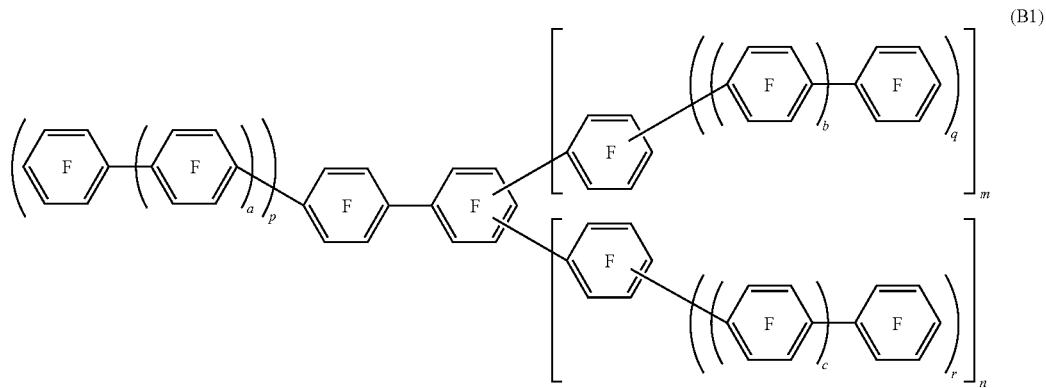

(B1)

wherein each of m and n which are independent of each other, is an integer of from 0 to 4, and $1 \leq m+n \leq 5$; each of p, q and r which are independent of one another, is an integer of from 0 to 5; and each of a, b and c which are independent of one another, is an integer of from 0 to 3.

When m+n is at least 2, the fluorinated polyarylene (B1) will be one having the main chain of a branched structure, and as mentioned above, is preferred, since it is excellent in heat resistance. Accordingly, m+n is preferably an integer of from 2 to 5, more preferably 2 or 3.

Each of p, q and r which are independent of one another, is preferably an integer of from 0 to 3.

Each of a, b and c which are independent of one another, is preferably an integer of from 0 to 2.

As specific examples of the fluorinated polyarylene (B1), polyarylenes represented by the following formulae (B1-1) to (B1-4) may be mentioned.

-continued

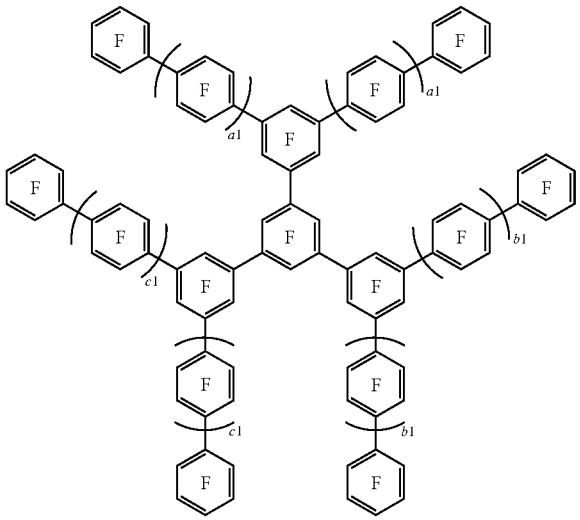

(B1-2)

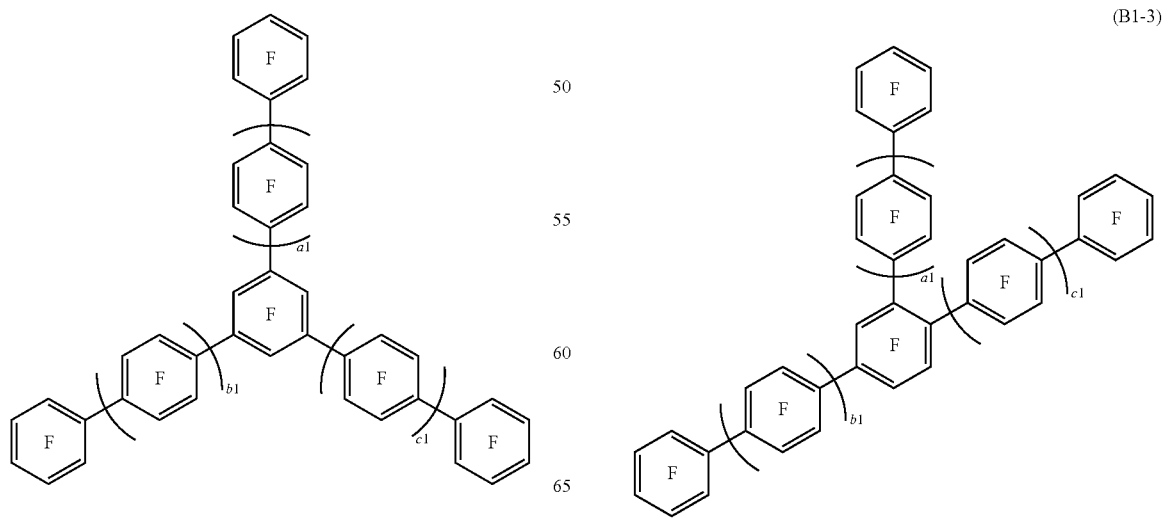

(B1-1)

(B1-3)

-continued (B1-4)

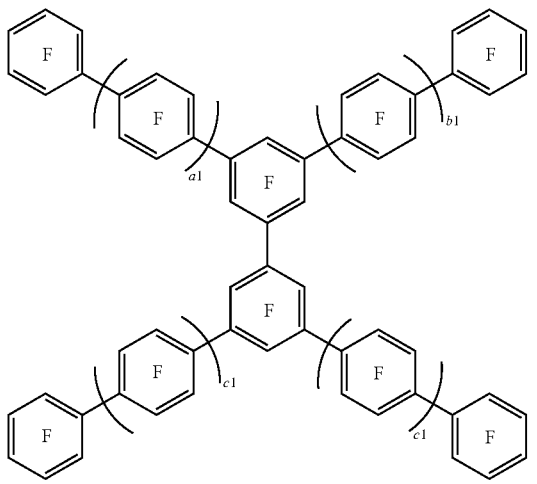

wherein a1, b1 and c1 are, respectively, the same as the above-mentioned a, b and c.

The number average molecular weight of the fluorinated polyarylene is preferably at a level of from 400 to 10,000, and from the viewpoint of the film forming property, it is more preferably at a level of from 1,000 to 5,000.

In the present invention, the fluorinated polyarylene ether means a polyarylene ether having at least one fluorine atom in its structure, and the "polyarylene ether" means a polymer having a polyarylene ether structure in the main chain.

The "polyarylene ether structure" means a polymer structure wherein a structure having two aromatic rings linked by an ether bond (—O—) is repeated, and "having a polyarylene ether structure in the main chain" means that in each aromatic ring constituting the polyarylene ether structure, at least two carbon atoms constituting the aromatic ring are carbon atoms in the carbon chain constituting the main chain (provided that an ether bond linking the aromatic rings is regarded as a part of the carbon chain constituting the main chain).

In this specification, among carbon chains constituting the fluorinated polyarylene ether, a portion containing a polyarylene ether structure, or a portion containing "an aromatic ring wherein at least two carbon atoms are carbon atoms in the carbon chain" is regarded as a part of the main chain, and a terminal portion containing no such a structure is referred to as "a side chain".

The carbon chain constituting the main chain of the fluorinated polyarylene ether may be linear or branched. It is preferably branched from the viewpoint of the effects of the present invention.

The fluorinated polyarylene ether preferably has fluorine atoms which are directly bonded to an aromatic ring. That is, the fluorinated polyarylene ether preferably has a fluorine atom-substituted aromatic ring.

Such a fluorinated polyarylene ether is preferably a polymer having a poly-substituted phenylene ether structural unit which has one or more aromatic rings and wherein at least three oxygen atoms are directly bonded to optional one or more aromatic rings, and a fluorinated aryl ether structural unit which has one or more aromatic rings to which one or more fluorine atoms are bonded and wherein the aromatic rings to which fluorine atoms are bonded, are bonded to the above oxygen atoms, since the polymer has low moisture absorption and is excellent in the characteristics of the obtainable electret.

The poly-substituted phenylene ether structural unit may, for example, be a structural unit derived from trihydroxybenzene, or a structural unit derived from trisphenol.

The fluorinated aryl ether structural unit may, for example, be one wherein an oxygen atom (—O—) is bonded to e.g. an aromatic ring of the above-mentioned fluorinated aryl structural unit.

As the polymer having the poly-substituted phenylene ether structural unit and the fluorinated aryl ether structural unit, a fluorinated aromatic polymer disclosed in e.g. JP-A-10-74750, WO03/8483, JP-A-2005-105115, etc. may, for example, be exemplified.

As the fluorinated aromatic polymer, particularly preferred is a cured product which is formed by curing a crosslinkable fluorinated aromatic prepolymer (hereinafter sometimes referred to as a crosslinkable fluorinated aromatic prepolymer (B2)). When the fluorinated aromatic polymer (B2) is such a cured product, the electret will be excellent in e.g. durability. That is, the crosslinkable fluorinated aromatic prepolymer (B2) is soluble in a solvent to obtain a solution, and by using such a solution, the layer (B) can be formed as a coating film. Such a coating film will be excellent in durability against high temperature treatment, and, for example, as compared with a case wherein a resin film such as PTFE is bonded to a substrate or a layer (A), a problem such as peeling or deformation is less likely to occur. Therefore, at the time of producing an electret, injection of electric charge can be carried out at a relatively high temperature (e.g. from 100 to 180° C.). Electric charge injected at such a high temperature is excellent in stability, and the durability as an electret will be excellent.

The crosslinkable fluorinated aromatic prepolymer (B2) is a fluorinated aromatic polymer having a crosslinkable functional group.

The crosslinkable functional group is a reactive functional group which is substantially free from a reaction during the production of the prepolymer and which undergoes a reaction to cause crosslinking among prepolymer molecules or extension of the chain, when an external energy is exerted at the time of preparing a cured product or at an optional time after the preparation of a cured product. The external energy may, for example, be heat, light, electron beams, etc., or a combination thereof.

In a case where heat is used as the external energy, a crosslinkable functional group is preferred which undergoes a reaction at a temperature of from 40 to 500° C. If the temperature for the reaction is too low, the stability cannot be secured during the storage of the prepolymer, and if it is too high, thermal decomposition of the prepolymer itself is likely to take place. Therefore, the temperature is preferably within the above range, more preferably from 60 to 400° C., most preferably from 70 to 350° C.

In a case where light is used as the external energy, it is also preferred to further add a photo-radical-generating agent, a photo-acid-generating agent, a sensitizer, etc. depending upon light with a specific wavelength. As the crosslinkable functional group, a crosslinkable functional group containing no polar group is preferred not to increase the relative dielectric constant of the cured product. Such a polar group, may, for example, be a hydroxy group, an amino group, a carbonyl group or a cyano group.

As specific examples of the crosslinkable functional group, a vinyl group, an allyl group, a methacryloyl(oxy) group, an acryloyl(oxy) group, a vinyloxy group, a trifluorovinyl group, a trifluorovinyloxy group, an ethynyl group, a 1-oxocyclopenta-2,5-diene-3-yl group, a cyano group, an alkoxy silyl group, a diaryl hydroxymethyl group and a hydroxyfluorenyl group may, for example, be mentioned. Among them, a vinyl group, a methacryloyl(oxy) group, an acryloyl(oxy) group, a trifluorovinyloxy group or an ethynyl group is preferred, since the reactivity is thereby high, and a high crosslinking density can be obtained. Further, an ethynyl group or a vinyl group is preferred from such a viewpoint that the obtainable cured product will have good heat resistance.

The crosslinkable functional group may be present in the main chain or in a side chain of the crosslinkable fluorinated aromatic prepolymer (B2). Here, "the crosslinkable functional group is present in the main chain" means that at least one carbon atom constituting the crosslinkable functional group (which may contain an ether bond) is the carbon atom in the carbon chain constituting the main chain.

From the viewpoint of availability of raw materials, it is preferred that the crosslinkable functional group is present in a side chain, and no crosslinkable functional group is present in the main chain.

The crosslinkable functional group may be introduced, for example, by using a compound having a crosslinkable functional group, as a material for the prepolymer (e.g. the after-mentioned compound (Y-1), compound (Y-2), etc.).

In the present invention, the crosslinkable fluorinated aromatic prepolymer (B2) is obtained by subjecting either one or both of a compound (Y-1) having a crosslinkable functional group and a phenolic hydroxyl group and a compound (Y-2) having a crosslinkable functional group and a fluorine atom-substituted aromatic ring to a condensation reaction with a fluorinated aromatic compound (Z) represented by the following formula (Z) and a compound (C) having at least 3 phenolic hydroxyl groups, in the presence of a HF (hydrogen fluoride)-removing agent. The crosslinkable fluorinated aromatic prepolymer (B2) is preferably a fluorinated polyarylene ether which has a crosslinkable functional group and an ether bond and which has a number average molecular weight of from $1 \times 10^3$ to $1 \times 10^5$.

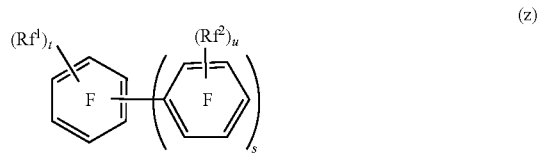

(Z)

wherein s is an integer of from 0 to 3, each of t and u which are independent of each other is an integer of from 0 to 3, each of $Rf^1$ and $Rf^2$ which are independent of each other, is a $C_{1-8}$ fluorinated alkyl group, provided that in a case where a plurality of $Rf^1$ or $Rf^2$ are present, the plurality of $Rf^1$ or $Rf^2$ may be the same or different from one another.

A cured product of the above fluorinated polyarylene ether (hereinafter sometimes referred to as the prepolymer (B2-1)) is a fluorinated polyarylene ether. Such a cured product is produced by using the compound (C) having at least three phenolic hydroxyl groups and it further has crosslinkable functional groups, whereby it satisfies the high heat resistance and excellent stability of the electret characteristics at the same time. That is, as the prepolymer (B2-1) has crosslinkable functional groups, crosslinking among the prepolymer (B2-1) molecules or the chain-extending reaction can be promoted, whereby the heat resistance of the obtainable cured product will be substantially improved, and at the same time, the solvent resistance will be improved.

Further, by using the above-mentioned fluorinated aromatic compound (Z), the flexibility of the obtainable cured product will be good. That is, as compared with a fluorinated aromatic prepolymer produced by using a fluorinated aromatic compound which by itself has a branched structure, the density of ether bonds can be increased, and the flexibility of the main chain will be improved, and as a result, the flexibility of the obtainable cured product will be good, and further, the flexibility of the electret will be good.

As the crosslinkable functional group which the compound (Y-1) and the compound (Y-2) have, the same one as the crosslinkable functional group mentioned in the description of the crosslinkable fluorinated aromatic prepolymer may be mentioned.

The compound (Y-1) has a crosslinkable functional group and a phenolic hydroxy group.

As the compound (Y-1), a compound (Y-1-1) having a crosslinkable functional group and one phenolic hydroxy group, and/or a compound (Y-1-2) having a crosslinkable functional group and two phenolic hydroxy groups, is preferred. As specific examples of the compound (Y-1-1), a phenol having a reactive double bond such as 4-hydroxystyrene and an ethynyl phenol such as 3-ethynyl phenol, 4-phenyl ethynyl phenol or 4-(4-fluorophenyl)ethynyl phenol may be mentioned. They may be used alone or in combination as a mixture of two or more of them.

As specific examples of the compound (Y-1-2), a bis(phenylethynyl)dihydroxybiphenyl such as 2,2'-bis(phenylethynyl)-5,5'-dihydroxybiphenyl or 2,2'-bis(phenylethynyl)-4,4'-dihydroxybiphenyl, and a dihydroxydiphenyl acetylene such as 4,4'-dihydroxytolan or 3,3'-dihydroxytolan, may be mentioned. They may be used alone or in combination as a mixture of two or more of them.

In the present invention, as the compound (Y-1), one wherein the hydrogen atom of its phenolic hydroxy group is substituted by a protective group such as an acetyl group, a pivaloyl group or a benzoyl group, may be used. In such a compound, the protective group may be dissociated by an alkali (HF removing agent) such as potassium hydroxide to be used for the condensation reaction, whereby a phenolic hydroxy group will be formed. As such a compound, 4-acetoxy styrene may, for example, be mentioned.

The compound (Y-2) has a crosslinkable functional group and a fluorine atom-substituted aromatic ring.

As the compound (Y-2), preferred is a compound having a crosslinkable functional group and a perfluoro aromatic ring such as perfluorophenyl or perfluorobiphenyl. As its specific examples, a fluorinated aryl having a reactive double bond, such as pentafluorostyrene, pentafluorobenzyl acrylate, pentafluorobenzyl methacrylate, pentafluorophenyl acrylate, pentafluorophenyl methacrylate, perfluorostyrene, pentafluorophenyltrifluorovinyl ether or 3-(pentafluorophenyl) pentafluoropropene, a fluorinated aryl having a cyano group, such as pentafluorobenzonitrile; a fluorinated arylacetylene such as pentafluorophenylacetylene or nonafluorobiphenylacetylene; and a fluorinated diarylacetylene such as phenylethynylpentafluorobenzene, phenylethynylnonafluorobiphenyl or decafluorotolan, may, for example, be mentioned. They may be used alone or in combination as a mixture of two or more of them.

As the compound (Y-2), a fluorinated arylacetylene is preferred, since the crosslinking reaction thereby proceeds at a relatively low temperature, and the heat resistance of the obtainable cured product will be improved.

The fluorinated aromatic compound (Z) is represented by the above formula (Z).

In the formula (Z), s is most preferably 1.

The fluorinated alkyl group for $Rf^1$ and $Rf^2$ is preferably a perfluoroalkyl group from the viewpoint of the heat resistance. As specific examples, a perfluoromethyl group, a perfluoroethyl group, a perfluoropropyl group, a perfluorobutyl group, a perfluorohexyl group and a perfluorooctyl group may be mentioned.

Each of t and u which are independent of each other, is preferably an integer of from 0 to 2, most preferably 0. The smaller the value of t and u, i.e. the smaller the number of $Rf^1$ and $Rf^2$, the easier the production of the fluorinated aromatic compound (Z).

As specific examples of the fluorinated aromatic compound (Z), in a case where is 0, perfluorobenzene, perfluorotoluene, perfluoroxylene, etc. may be mentioned. In a case where s is 1, perfluorobiphenyl, etc. may be mentioned. In a case where s is 2, perfluoroterphenyl, etc. may be mentioned. In a case where s is 3, perfluoro(1,3,5-triphenylbenzene) or perfluoro(1,2,4-triphenylbenzene) is preferred, and perfluorobenzene or perfluorobiphenyl is particularly preferred. They may be used alone or in combination as a mixture of two or more of them.

In the compound (C) having at least three phenolic hydroxy groups, the number of phenolic hydroxy groups may be at least 3, practically preferably from 3 to 6, particularly preferably from 3 to 4.

As the compound (C), a poly-functional phenol is preferred. As specific examples, trihydroxybenzene, trihydroxybiphenyl, trihydroxynaphthalene, 1,1,1-tris(4-hydroxyphenyl)ethane, tris(4-hydroxyphenyl)benzene, tetrahydroxybenzene, tetrahydroxybiphenyl, tetrahydroxybinaphthyl, a tetrahydroxyspiroindan, etc. may be mentioned.

As the compound (C), a compound having three phenolic hydroxy groups is preferred, since the flexibility of the cured film thereby obtainable will be high. Among them, trihydroxybenzene or 1,1,1-tris(4-hydroxyphenyl)ethane is particularly preferred, since the dielectric constant of the obtainable cured product will be low.

As the HF-removing agent to be used for the above condensation reaction, a basic compound is preferred, and particularly preferred is a carbonate, hydrogen carbonate or hydroxide of an alkali metal. As specific examples, sodium carbonate, potassium carbonate, sodium hydrogencarbonate, potassium hydrogencarbonate, sodium hydroxide or potassium hydroxide, may, for example, be mentioned.

The prepolymer (B2-1) has crosslinkable functional groups derived from the compound (Y-1) and/or the compound (Y-2).

The content of crosslinkable functional groups in the prepolymer (B2-1) is preferably from 0.1 to 4 mmol, more preferably from 0.2 to 3 mmol, of the crosslinkable functional groups, per 1 g of the prepolymer (B2-1). By adjusting this content to be at least 0.1 mmol, the heat resistance and solvent resistance of the cured product can be made high, and by adjusting it to be at most 4 mmol, brittleness can easily be controlled to be small.

The prepolymer (B2-1) may have a side chain represented by the following formula (I) in addition to a crosslinkable functional group and an ether bond. When the prepolymer (B2-1) has such a side chain, the cured product will be excellent in flexibility or elasticity.

$$Rf—CH_2—O— \quad (I)$$

wherein Rf represents a $C_{3-50}$ fluorinated alkyl group (provided that it may contain an etheric oxygen atom).

In the above formula (I), Rf represents a $C_{3-50}$ fluorinated alkyl group, which may contain an etheric oxygen atom. The fluorinated alkyl group as Rf means one wherein some or all of hydrogen atoms bonded to carbon atoms of an alkyl group are substituted by fluorine atoms. Further, such a fluorinated alkyl group may be a chain-form alkyl group or a cycloalkyl group.

Rf is preferably linear, branched or cyclic. Further, Rf is preferably a perfluoroalkyl group wherein all of hydrogen atoms bonded to carbon atoms of an alkyl group are substituted by fluorine atoms.

As a linear one among side chains represented by the above formula (I), one represented by the following formula (I-1) or (I-2) is preferred. As a more preferred example of the side chain represented by the following formula (I-1), a monovalent group represented by the following formula (I-1-1) or (I-1-2) may be mentioned.

$$Rf^a-O—(CF_2)_m—CH_2—O— \quad (I-1)$$

$$CF_3(OCF_2CF_2)_k—O—CF_2—CH_2—O— \quad (I-1-1)$$

$$C_pF_{2p+1}OCF_2CF_2—O—CF_2—CH_2—O— \quad (I-1-2)$$

$$CF_3(CF_2)_j—CH_2—O— \quad (I-2)$$

In the formula (I-1), m is an integer of from 1 to 5, and $Rf^a$ is a $C_{4-50}$ fluorinated alkyl group, which may contain an etheric oxygen atom. It is more preferred that m is an integer of from 1 to 3.

In the formula (I-1-1), k is an integer of from 1 to 10.
In the formula (I-1-2), p is an integer of from 1 to 10.
In the formula (I-2), j is an integer of from 2 to 40.

As a branched chain type among side chains represented by the above formula (I), a monovalent group represented by the following formula (I-3) or (I-4) is preferred.

$$CF_3C_2F_4O[CF(CF_3)CF_2O]_iCF(CF_3)—CH_2—O— \quad (I-3)$$

$$F[CF_2CF(CF_3)C_2F_4O]_hCF_2CF(CF_3)CF_2—CH_2—O— \quad (I-4)$$

In the formula (I-3), i is an integer of from 0 to 10.
In the formula (I-4), h is an integer of from 0 to 10.

A cyclic type among side chains represented by the above formula (I), a monovalent group represented by the following formula (I-5), (I-6) or (I-7) is preferred.

(I-5)

(I-6)

(I-7)

The position at which the side chain represented by the formula (I) is introduced, is not particularly limited, but from the viewpoint of the production, it is preferred that such a side chain is bonded to a halogen-substituted aromatic ring in the main chain. That is, it is preferred that a halogen-substituted aromatic ring is present in the main chain, and a side chain represented by the formula (I) is bonded to such an aromatic ring.

The halogen-substituted aromatic ring to which the side chain is bonded, may be an aromatic ring constituting a polyarylene ether structure or may be another aromatic ring other than that. From such a viewpoint that the production of a prepolymer is easy, the latter is more preferred, i.e. a side chain represented by the formula (I) is bonded to a halogen-substituted aromatic ring not constituting a polyarylene ether structure. Further, the halogen-substituted aromatic ring to which such a side chain is bonded, is more preferably a perfluoroaromatic ring.

"The side chain represented by the formula (I)" present in one molecule of the prepolymer (B2-1) may be one type, or two or more types. The content of "the side chain represented by the formula (I)" in the prepolymer (B2-1) is preferably from 0.01 to 1 g, more preferably from 0.05 to 0.5 g, per 1 g of the prepolymer (B2-1). When such a content is at least the lower limit within the above range, the effect for improving water repellency and oil repellency will be good, and when it is at most the upper limit, the heat resistance will be good.

The number average molecular weight of the prepolymer (B2-1) is within a range of from $1\times10^3$ to $1\times10^5$, preferably from $1.5\times10^3$ to $1\times10^5$. Within such a range, the coating properties of a prepolymer solution having such a prepolymer dissolved in a solvent, are good, and a cured product in a film form (a cured film) can easily be obtainable. Further, the obtained cured film has good heat resistance, mechanical properties, solvent resistance, etc.

In a case where the cured product of the prepolymer (B2-1) is brittle, in order to improve the flexibility of the cured product, a co-condensing component may be added at the time of producing the prepolymer (B2-1). As such a co-condensing component, a compound (Y-3) having two phenolic hydroxy groups other than (Y-1) may be mentioned, which is capable of improving the flexibility of the cured film.

Such a compound (Y-3) having two phenolic hydroxy groups, may, for example, be a bifunctional phenol such as dihydroxybenzene, dihydroxybiphenyl, dihydroxyterphenyl, dihydroxynaphthalene, dihydroxyanthracene, dihydroxyphenanthracene, dihydroxy-9,9-diphenylfluorene, dihydroxybenzofuran, dihydroxydiphenyl ether, dihydroxydiphenyl thioether, dihydroxybenzophenone, dihydroxy-2,2-diphenylpropane, dihydroxy-2,2-diphenylhexafluoropropane or dihydroxybinaphthyl. They may be used alone or in combination as a mixture of two or more of them.

When an external energy such as heat, light or electron beam is applied to the crosslinkable fluorinated aromatic prepolymer (B2) such as the above prepolymer (B2-1), the crosslinkable functional groups will react, and crosslinking or chain extension among the prepolymer molecules will proceed to form a cured product.

At the time of curing the crosslinkable fluorinated aromatic prepolymer (B2), for the purpose of increasing the reaction rate of the crosslinking reaction or reducing the reaction defects, various catalysts or additives may be used together with the crosslinkable fluorinated aromatic prepolymer (B2).

For example, in a case where the crosslinkable fluorinated aromatic prepolymer (B2) contains ethynyl groups or vinyl groups as crosslinkable functional groups, the above catalysts may, for example, be amines such as aniline, triethylamine, aminophenyltrialkoxysilane and aminopropyltrialkoxysilane, or organic metal compounds containing molybdenum, nickel, etc.

As the above additives, biscyclopentadienone derivatives are preferred. A ethynyl group and a cyclopentadienone group (1-oxocyclopenta-2,5-dien-3-yl group) will form an adduct by a Diels-Alder reaction by heat, followed by a carbon monoxide-removing reaction to form an aromatic ring. Accordingly, when a biscyclopentadienone derivative is used, crosslinking or chain extension can be carried out wherein an aromatic ring is a linking moiety.

Specific examples of such biscyclopentadienone derivatives include, for example, 1,4-bis(1-oxo-2,4,5-triphenyl-cyclopenta-2,5-dien-3-yl)benzene, 4,4'-bis(1-oxo-2,4,5-triphenyl-cyclopenta-2,5-dien-3-yl)biphenyl, 4,4'-bis(1-oxo-2,4,5-triphenyl-cyclopenta-2,5-dien-3-yl)1,1'-oxybisbenzene, 4,4'-bis(1-oxo-2,4,5-triphenyl-cyclopenta-2,5-dien-3-yl)1,1'-thiobisbenzene, 1,4-bis(1-oxo-2,5-di-[4-fluorophenyl]-4-phenyl-cyclopenta-2,5-dien-3-yl)benzene, 4,4'-bis(1-oxo-2,4,5-triphenyl-cyclopenta-2,5-dien-3-yl)1,1'-(1,2-ethanediyl) bisbenzene and 4,4'-bis(1-oxo-2,4,5-triphenyl-cyclopenta-2,5-dien-3-yl)1,1'-(1,3-propanediyl)bisbenzene.

Among these biscyclopentadienone derivatives, entirely aromatic skeleton biscyclopentadienone derivates are preferred from the viewpoint of the heat resistance. They may be used alone or in combination as a mixture of two or more of them.

The above-mentioned polyparaxylylene resin is a special polymer which can be polymerized in a gas phase at a normal temperature. For example, the polyparaxylylene resin is prepared by sublimating a dimer shown below, at a temperature of about 160° C., followed by thermal decomposition at 690° C. to obtain a monomer, which is introduced into a vacuum container (absolute pressure of 4 Pa) at a normal temperature and polymerized on a solid surface.

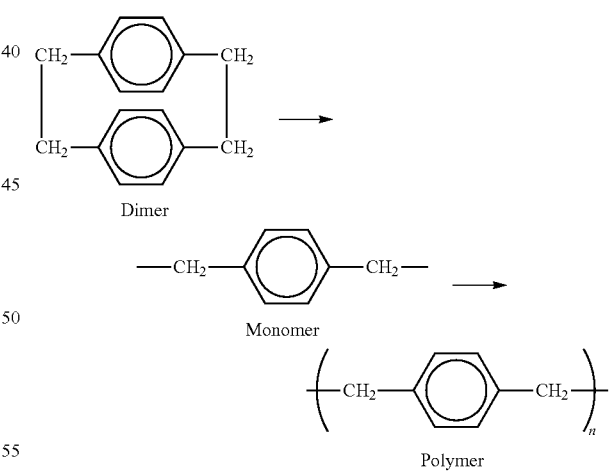

The polyparaxylylene resin includes some types. Among them, one having a molecular structure wherein chlorine is bonded to a benzene ring (tradename: Parylene-C) has a relative dielectric constant of 2.95 at a frequency of 1 MHz and has a characteristic such that the dielectric breakdown strength and chemical resistance are high, and thus it is suitable as the polymer compound (b). Including such Parylene-C, examples of polyparaxylylenes useful as the polymer compound (b) will be shown below. Here, below the respective structural formulae, tradenames are shown.

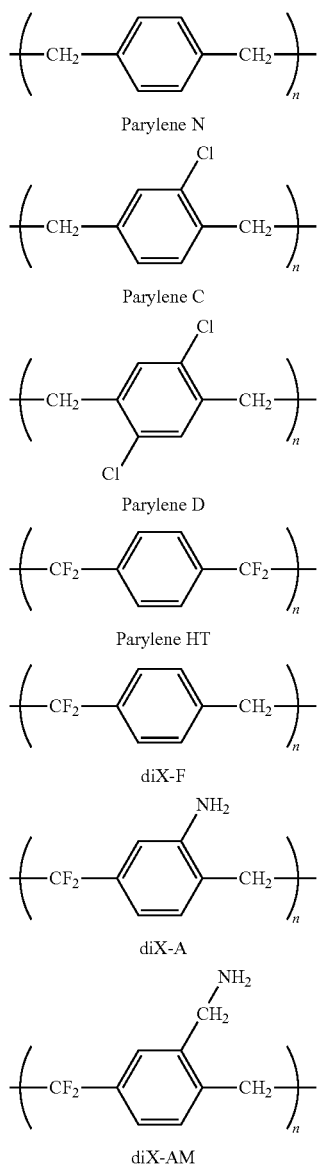

As the polymer compound (b), a thermosetting resin or an ultraviolet curable resin may be employed from the viewpoint of increasing the glass transition temperature or melting point. As such a thermosetting resin or ultraviolet curable resin, a polyimide, an epoxy resin or an acrylic resin may, for example, be exemplified from the above examples, and from the viewpoint of the above relative dielectric constant, a polyimide is more preferably employed.

In a case where a polyimide is used as the polymer compound (b), a polyimide precursor excellent in solubility in e.g. an organic solvent is coated and thermally treated to convert the polyimide precursor to a polyimide thereby to form the layer (B). As the polyimide precursor, polyamic acid, or its ester may commonly be used. When a polyimide precursor such as polyamic acid is heated to a high temperature of from 200 to 350° C., an imide ring-closing reaction takes place, and it can be converted to a thermally, chemically, electrically stable polyimide. In the present invention, it is possible to employ a commonly commercially available polyimide.

The polyimide precursor to be used in the present invention is preferably a polyamic acid obtained by reacting a tetracarboxylic acid dianhydride with a diamine compound, or its ester.

The tetracarboxylic acid dianhydride is not particularly limited, and an aromatic tetracarboxylic acid dianhydride which is commonly used for a polyimide synthesis may be used. Specifically, 3,3',4,4'-benzophenonetetracarboxylic dianhydride (BTDA), 3,3',4,4'-biphenyltetracarboxylic dianhydride, 2,3,3',4'-biphenyltetracarboxylic dianhydride, pyromellitic dianhydride, 1,3-bis(2,3-dicarboxyphenoxy)benzene dianhydride, 1,4-bis(2,3-dicarboxyphenoxy)benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride and 2,2',6,6'-biphenyltetracarboxylic dianhydride may, for example, be mentioned.

As the diamine compound, an aromatic diamine compound is preferred. The aromatic diamine compound is not particularly limited, and an aromatic diamine compound commonly used for a polyamide synthesis may be used. Specifically, 4,4'-diaminodiphenylmethane (DDM), 4,4'-diaminodiphenylether (DPE), 4,4'-bis(4-aminophenoxy)biphenyl (BAPB), 1,4'-bis(4-aminophenoxy)benzene (TPE-Q), 1,3'-bis(4-aminophenoxy)benzene (TPE-R), o-phenylenediamine, m-phenylenediamine, p-phenylenediamine, 3,4'-diaminodiphenyl ether, 4,4'-diaminodiphenyl sulfone, 3,4-diaminodiphenyl sulfone, 3,3'-diaminodiphenyl sulfone, 4,4'-methylene-bis(2-chloroanyline), 3,3'-dimethyl-4,4'-diaminobiphenyl, 2,6'-diaminotoluene, 2,4-diaminochlorobenzene, 3,3'-diaminobenzophenone, 3,4-diaminobenzophenone and 4,4'-diaminobenzophenone may, for example, be mentioned.

The polymer compound (b) preferably has a glass transition temperature or melting point of at least 80° C., more preferably at least 110° C. When the glass transition temperature or melting point is at least 80° C., the electret will be excellent in the heat resistance and charge retention stability.

The weight average molecular weight of the polymer compound (b) is preferably from 3,000 to 10,000,000, more preferably from 10,000 to 1,000,000.

The inorganic substance (c) may be suitably selected from known inorganic substances, depending upon the desired relative dielectric constant. Specifically, it is preferably at least one member selected from the group consisting of a metal oxide, a metal sulfide or a metal halide, and particularly from the viewpoint of the relative dielectric constant, a metal oxide is suitably employed.

The metal oxide may, for example, be silicon oxide, titanium oxide, zirconium oxide, aluminum oxide, cerium oxide, calcium oxide, magnesium oxide, tin oxide, manganese dioxide, nickel oxide, chromium oxide, cobalt oxide, silver oxide, copper oxide, zinc oxide, iron oxide, molybdenum oxide, barium titanate, strontium titanate, or potassium niobate.

The metal sulfide may, for example, be zinc sulfide, aluminum sulfide, potassium sulfide, silver sulfide, silicon sulfide, tin sulfide, cerium sulfide, magnesium sulfide, copper sulfide, iron sulfide, or molybdenum sulfide.

The metal halide may, for example, be silver fluoride, calcium fluoride, cerium fluoride, copper fluoride, barium fluoride, magnesium fluoride, lithium fluoride, copper chloride, silver chloride, calcium chloride, zirconium chloride, tin chloride, cerium chloride, silver bromide, cobalt bromide, cesium bromide or copper bromide.

Among them, a metal oxide is preferred, and from the viewpoint of electret properties, at least one member selected from the group consisting of silicon oxide, titanium oxide, zirconium oxide, aluminum oxide, cerium oxide, tin oxide, manganese dioxide, nickel oxide, iron oxide and barium titanate is preferred, and particularly preferred is silicon oxide.

The layer (B) may be one containing the polymer compound (b) or one containing the inorganic substance (c).

The method for forming the layer (B) is not particularly limited, and a conventional film-forming method may be used depending upon the material to be used.

For example, in a case where the polymer compound (b) is to be used, film forming may be carried out by a wet coating method, or film forming may be carried out by press-forming a film. Otherwise, film forming may be carried out by a dry process such as vapor deposition, CVD or sputtering. Particularly from the viewpoint of the film forming process, film forming is preferably carried out by a wet coating method.

In a case where the layer (B) is to be formed by a wet coating method, as the polymer compound (b), one having a solubility such that it is soluble in a solvent, preferably soluble at a concentration of at least 5 mass % in a solvent to be used at 25° C., is used. If such a solubility is less than 5 mass %, it tends to be difficult to obtain a good coating film. Such a solubility is preferably at least 10 mass %, more preferably at least 15 mass %. The upper limit of the solubility is preferably 50 mass %, more preferably 30 mass % in consideration of deterioration of the filtration property or film forming property by an increase of the solution viscosity.

The film forming of the layer (B) by a coating method can be carried out by the same method as the method for film forming the coating film as mentioned as the method for forming the layer (A). That is, it can be carried out by dissolving the polymer compound (b) in a solvent to prepare a coating composition, and coating the surface of a substrate or the layer (A) with the coating composition, followed by drying by e.g. baking.

To such a coating composition, a silane coupling agent may be incorporated. A coating film (layer (B)) formed by using such a coating composition will be excellent in adhesion to the substrate or the layer (A). As such a silane coupling agent, the same one as described above may be employed.

Further, as the coating composition, one having a prepolymer of the polymer compound (b) dissolved in a solvent may be prepared, and such a coating composition is applied to the surface of a substrate or the layer (A) and then cured by applying an external energy such as heat, light or electron beam to obtain the layer (B) as a cured film.

In a case where the inorganic substance (c) is used, the layer (B) may be formed by a wet method such as a coating method or a sol gel method, or may be formed by a dry process such as a sputtering method, a vapor deposition method or a CVD method.

Now, a case where a silicon oxide film is to be formed by a wet method, will be described. For example, a method is preferably employed wherein a hydrolyzable silane compound such as a tetraalkoxy silane or an alkyltrialkoxy silane, a partially hydrolyzed condensate of a hydrolyzable silane compound, a polysilazane or the like is dissolved in the above-mentioned protic solvent or aprotic solvent, followed by coating and baking in the atmospheric air to form a silicon oxide film. In a case where a wet method is employed, the method is preferably carried out in a non-aqueous system from the viewpoint of the electret properties. As a film forming method in a non-aqueous system, in a case where a silicon oxide film is to be formed, a method is preferably employed wherein a xylene solution of polysilazane is coated and fired in the atmospheric air to form a silicon oxide film. The firing temperature in this case is preferably from 150° C. to 600° C., more preferably from 180° C. to 450° C. with a view to preventing cracking due to a difference in the linear expansion coefficient from the layer (A).

Now, the above polysilazane will be described in detail.

The polysilazane is a polymer having at least two repeating units represented by (—Si—N—), and in this chemical formula, to the remaining two bonds of the silicon atom (tetravalent) and to the remaining one bond of the nitrogen atom (trivalent), a hydrogen atom or an organic group (such as an alkyl group) is bonded. The polysilazane is not limited to a polymer of a chain structure composed solely of the above repeating unit, but may be a polymer wherein one or both of the above-mentioned remaining two bonds of the silicon atom are bonded to the above bond of the nitrogen atom to form a cyclic structure. Such a polymer may be composed solely of repeating units of such a cyclic structure or may be a chain form polymer partially having such a cyclic structure.

As the polysilazane in the present invention, a polysilazane or modified polysilazane disclosed in e.g. JP-A-9-31333 or in references disclosed in such publication may be used.

The polysilazane will be decomposed in the presence of oxygen, and nitrogen atoms are substituted by oxygen atoms to form silicon oxide (also called silica). The silicon oxide film formed from such a polysilazane is more dense as compared with a silicon oxide film formed from the above-mentioned hydrolyzable silane compound. For example, the silicon oxide film formed from perhydropolysilazane is more dense as compared with a silicon oxide film formed from a tetrafunctional hydrolyzable silane compound such as a tetraalkoxysilane and is excellent in the surface properties such as abrasion resistance and in the charge retention performance and heat resistance when formed into an electret.

In order to cure the polysilazane to form a silicon oxide film, heating so-called firing is usually required. However, in the present invention, the firing temperature is restricted, since it is necessary to laminate the layer (B) on the layer (A) containing the polymer compound (a). That is, it is difficult to carry out curing by heating to a temperature higher than the heat resistance temperature of the polymer compound (a). Therefore, in some cases, it will be necessary to cure the polysilazane at a temperature lower than the heat resistance temperature of the polymer compound (a).

Usually, as the temperature for firing the polysilazane in the present invention, a temperature lower than the heat resistance temperature of the polymer compound (a) constituting the layer (A) to be laminated with the layer (B), is employed, and the upper limit of the temperature is usually 400° C. In order to prevent formation of cracks due to the difference in the linear expansion coefficient from the layer (A), the firing temperature is preferably at most 200° C.

Further, as an atmosphere for the firing, an atmosphere in which oxygen is present, such as air, is preferred. By the firing of the polysilazane, its nitrogen atoms will be substituted by oxygen atoms to form a silicon oxide film. By carrying out the firing in an atmosphere wherein sufficient oxygen is present, a dense silicon oxide layer will be formed. Further, treatment with water or steam is also useful for the curing at a low temperature (see JP-A-7-223867).

In order to lower the temperature for firing the polysilazane, a catalyst is usually employed. Depending upon the type or amount of the catalyst, the polysilazane can be fired at a low temperature, and in some cases, curing can be carried out at room temperature without requiring the firing.

As the catalyst, it is preferred to employ a catalyst capable of firing and curing the polysilazane at a lower temperature. As such a catalyst, a metal catalyst containing fine particles of a metal such as gold, silver, palladium, platinum or nickel (JP-A-7-196986), an amine, an acid (JP-A-9-31333), etc.

may, for example, be mentioned. The amine may, for example, be an alkylamine, a dialkylamine, a trialkylamine, an arylamine, a diarylamine or a cyclic amine. The acid may, for example, be an organic acid such as acetic acid, or an inorganic acid such as hydrochloric acid.

The average particle size of the fine particles of the metal catalyst is preferably smaller than 0.1 µm, more preferably smaller than 0.05 µm in order to secure the transparency of the cured product. In addition, as the average particle size becomes small, the specific surface area increases, and the catalyst stability increases, and thus from the viewpoint of the improvement of the catalytic performance, the metal catalyst having a smaller average particle size is preferred.

The amine or acid may also be incorporated to the polysilazane solution. Otherwise the curing can be accelerated by contacting a solution of the amine or acid (including an aqueous solution) or its vapor (including the vapor from the aqueous solution) with the polysilazane.

In a case where the catalyst is used as incorporated to the polysilazane, the amount of the catalyst to be incorporated is preferably from 0.01 to 10 parts by mass, more preferably from 0.05 to 5 parts by mass, per 100 parts by mass of the polysilazane. If the amount to be incorporated is less than 0.01 part by mass, no adequate catalyst effects can be expected, and if it exceeds 10 parts by mass, agglomeration of the catalyst itself is likely to take place, thereby impairing the electrical insulation property, transparency, etc.

<Laminate>

The laminate in the present invention comprises the directly laminated layers (A) and (B) as the essential constituting units. Further, in the present invention, the layer (A) is disposed on the outermost surface on a side opposite to the side where electric charge is injected at the time of injecting electric charge to the laminate to form an electret. Further, the laminate may have, as the layer (A), a layer (A) disposed at a position other than the outermost surface.

The laminate may be constituted solely by the layers (A) and (B) or may contain another layer. Such another layer may, for example, be a metal layer or an organic monomolecular film layer by e.g. the above-mentioned silane coupling agent. Such a layer can be formed by a conventional method.

From the viewpoint of the film forming process, the laminate is preferably a $(n_A+n_B)$ layered laminate wherein $n_A$ layers of layer (A) and $n_B$ layers of layer (B) are alternately laminated. Here, $n_A$ is an integer of from 1 to 5, $n_B$ is an integer of from 1 to 5, and the value of $n_A-n_B$ is 0 or 1. Particularly, $n_A$ is preferably from 1 to 2, $n_B$ is also preferably 1 or 2, and the value of $n_A-n_B$ is preferably 0.

Preferred specific examples of the laminate may, for example, be a two-layered laminate wherein from a side opposite to the side where electric charge is injected, the layer (A) and the layer (B) are laminated in this order (hereinafter referred to as layer (A)/layer (B), the same applies to other laminates); a three-layered laminate of layer (A)/layer (B)/ layer (A); a four-layered laminate of layer (A)/layer (B)/layer (A)/layer (B), etc.

The shape and size of the laminate may suitably be set depending upon the shape and size of the desired electret. An electret is usually employed in the form of a film having a thickness of from 1 to 200 µm, and the laminate is preferably a film having a thickness of from 1 to 200 µm. The thickness of such a laminate is preferably from 3 to 50 µm, particularly preferably from 5 to 20 µm, since such a thickness is advantageous for the processability and the properties as an electret.

Further, in the laminate, the thickness of the layer (B) (thickness per one layer) is at least 1 µm. When the thickness of the layer (B) (thickness per one layer) is within this range, the surface charge density of an electret is high. Such a thickness is preferably at least 1.5 µm, more preferably at least 2 µm, whereby the above effect will be excellent. The upper limit of such a thickness is preferably 20 µm, more preferably 10 µm from the viewpoint of the film-forming process and improvement of the surface charge density.

The thickness of the layer (A) (thickness per one layer) is not particularly limited and may be suitably set in consideration of the entire thickness of the laminate, the number of layers (A), etc. in consideration of the charge retention performance, heat resistance, etc. of the electret, the thickness of the layer (A) (thickness per one layer) is preferably from 3 to 50 µm, more preferably from 5 to 20 µm. The thickness of each of the layer (A) and the layer (B) as well as the entire thickness of the laminate, can be measured by an optical interferotype film thickness measuring apparatus.

The laminate can be formed by sequentially laminating a layer (A) and a layer (B) on a substrate so that the layer (A) will be in contact directly with the substrate. For example, a double layered laminate can be formed by firstly forming a layer (A) on a substrate and then laminating a layer (B) on the layer (A). Further, in the case of a at least three-layered laminate, by laminating a layer (A) and a layer (B) sequentially and alternately depending upon the desired number of laminated layers, from the substrate side, it is possible to form a laminate having a desired number of laminated layers. At that time, another layer may optionally be laminated, but the laminate contains a laminate wherein at least a layer (A) and a layer (B) are directly laminated. And, the layer (A) is disposed on the outermost surface on a side opposite to the side where electric charge is injected.

As a substrate, it is possible to employ a substrate which can be connected to earth when electric charge is injected to the obtained laminate, without selecting the material. As a preferred material, a conductive metal such as gold, platinum, copper, aluminum, chromium or nickel may be mentioned. Further, a material other than a conductive metal, such as an insulating material such as an inorganic material of e.g. glass or an organic polymer material such as polyethylene terephthalate, polyimide, polycarbonate or an acrylic resin may also be used so long as it is one having its surface coated with a metal film by a method such as sputtering, vapor deposition or wet coating.

Further, a semiconductor material such as silicon may also be used as a substrate so long as it is one having a similar surface treatment applied, or the ohmic value of the semiconductor material itself is low. The ohmic value of the substrate material is preferably at most 0.1 Ωcm, particularly preferably at most 0.01 Ωcm, by volume resistivity.

Such a substrate may be a flat plate having a smooth surface or one having convexoconcave formed thereon. Otherwise, it may have patterning applied in various shapes. Particularly in a case where the above-mentioned insulating substrate is employed, a pattern or convexoconcave may be formed on the insulating substrate itself, or a pattern or convexoconcave may be formed on a metal film coated on the surface.

As a method for forming a pattern or convexoconcave on the substrate, a conventional method may be employed without any particular restriction. As the method for forming a pattern or convexoconcave, either a vacuum process or a wet process may be employed. As specific examples of such a method, a vacuum process may, for example, be a sputtering method via a mask or a vapor deposition method via a mask, and a wet process may, for example, be a roll coater method, a casting method, a dipping method, a spin coating method, a casting-on-water method, a Langmuir•Blodgett method, a die coating method, an ink jet method or a spray coating method.

Otherwise, it is possible to employ a printing technique such as a relief printing method, a gravure printing method, a lithography method, a screen printing method or a flexo printing method. Further, as a method for forming a fine pattern or convexoconcave, a nanoimprinting method or a photolithography method may, for example, be employed.

As a method for laminating the layers (A) and (B) as well as another layer, film forming by the above-described coating method or the like may simply be repeated, or during repetition of the film forming, surface treatment may be applied to the undercoating.

As such surface treatment, it is possible to employ a method of applying the above-mentioned silane coupling agent or a method of roughening or presenting hydrophilicity to the surface by plasma treatment.

In the case of applying the silane coupling agent, such surface treatment can be carried out by dissolving the above-mentioned silane coupling agent in the above-mentioned protic solvent, aprotic solvent or protic fluorinated solvent, followed by coating by the same coating method as described above.

Further, in the case of roughening or presenting hydrophilicity to the surface by plasma treatment, it is possible to employ plasma treatment using a gas such as oxygen, nitrogen, argon, methane, $CHF_3$ or $CF_4$. Such gases may be used alone or in suitable combination as a mixture. In such plasma treatment, to minimize the decrease of the underlayer film thickness, it is preferred to employ oxygen, nitrogen, argon, methane gas or a gas mixture thereof.

In a case where a copper substrate, a low resistance silicon substrate or the like is used as a substrate having a low resistance, it is possible to inject electric charge to the laminate to form an electret without removing, from the substrate, the laminate formed on the substrate, as described hereinafter.

As described above, in the laminate prepared by sequentially laminating the layer (A) and the layer (B) on the substrate, the layer (A) is in contact with the substrate. Therefore, at the time of injecting electric charge to the laminate on the substrate to form an electret as mentioned above, the layer (A) is disposed on the outermost surface on a side opposite to the side where electric charge is injected, of the laminate. As the layer (A) is so disposed, the effects of the present invention can be sufficiently obtained.

Further, one disposed on the outermost surface on the side where electric charge is injected, of the laminate, may be the layer (A) or the layer (B). It is preferred that the layer (B) is disposed on the outermost surface on the side where electric charge is injected, of the laminate, since the effects of the present invention will be thereby excellent.

The electret of the present invention can be produced by injecting electric charge to the above-described laminate.

As a method for injecting electric charge to the laminate, it is usually possible to employ any method so long as it is a method to charge an insulator. For example, it is possible to use a corona discharge method, an electron beam bombardment method, an ion beam bombardment method, a radiation method, a light irradiation method, a contact charging method or a liquid contact charging method, as disclosed in G. M. Sessler, Electrets Third Edition, pp. 20, Chapter 2.2, "Charging and Polarizing Methods" (Laplacian Press, 1998) (hereinafter referred to as Non-Patent Document 1). Especially, for the electret of the present invention, it is preferred to employ a corona discharge method or an electron beam bombardment method.

Further, as a temperature condition at the time of injecting electric charge, it is preferred to carry out the injection at a temperature of at least the glass transition temperature of the polymer compound (a) from the viewpoint of the stability of electric charge maintained after the injection, and it is particularly preferred to carry out the injection under a temperature condition of about the glass transition temperature+from 10 to 20° C. Further, the voltage to be applied at the time of injecting electric charge is preferably high so long as it is lower than the dielectric breakdown voltage of the laminate. The voltage applied to the laminate in the present invention is from 6 to 30 kV, preferably from 8 to 15 kV in the case of positive charge, and it is from −6 to −30 kV, preferably from −8 to −15 kV in the case of negative charge. The polymer compound (a) is capable of maintaining a negative electric charge more stably than a positive electric charge, and accordingly, it is further preferred to apply a voltage of from −8 to −15 kV.

After injection of the electric charge, the electret may be used as it is together with the substrate for an electrostatic induction conversion device, or it may be removed from the substrate and then used for an electrostatic induction conversion device.

The electret of the present invention is suitable as an electrostatic induction conversion device to convert electric energy to kinetic energy.

Such an electrostatic induction conversion device may, for example, be a vibration-type power-generating unit, an actuator or a sensor. The structure of such an electrostatic induction conversion device may be the same as a conventional one except that as the electret, the electret of the present invention is used.

As compared with conventional electrets, the electret of the present invention is capable of making the surface charge density high and has a high surface voltage. Therefore, the electrostatic induction conversion device using such an electret has an improved efficiency for conversion between electric energy and kinetic energy and exhibits an excellent performance.

The reason as to why such effects can be obtained, is not clearly understood. However, it is considered that to the layer (A) playing a role of electric charge retention, the layer (B) different in the relative dielectric constant is laminated in a prescribed film thickness, whereby internal polarization results by Maxwell-Wagner effects (see Non-Patent Document 1, p. 25), and electric charge separation is promoted in the electret film, and at the same time, it is possible by the layer (B) to prevent electric charge maintained in the layer (A) from flowing out of the electret film.

EXAMPLES

Now, specific cases of the above embodiment will be described as Examples. However, it should be understood that the present invention is by no means restricted to the following Examples.

The relative dielectric constants of materials used in each of the following Examples are all values disclosed in brochures (values measured in accordance with ASTM D150 at a frequency of 1 MHz).

The volume resistivity is a value measured in accordance with ASTM D257.

The dielectric breakdown voltage is a value measured in accordance with ASTM D149.

The intrinsic viscosity [η](30° C.) (unit: dl/g) is a value measured by an Ubbelohde Viscometer at 30° C. by using perfluoro(2-butyltetrahydrofuran) as a solvent.

Further, in each of the following Examples, as a substrate to form an electret, a low resistance silicon substrate (volume resistivity of from 0.003 to 0.007 Ωcm) was used. In the following Examples, such a substrate is referred to as a "silicon substrate".

Further, in each of the following Examples, for the measurement of the thickness of each layer was carried out by using optical interferotype film thickness measuring apparatus C10178 manufactured by Hamamatsu Photonics K.K.

Preparation Example 1

Preparation of Polymer Composition Solution M1

(1) Preparation of Polymer Solution 45 g of perfluorobutenyl vinyl ether ($CF_2$=$CFOCF_2CF_2CF$=$CF_2$), 240 g of deionized water, 16 g of methanol and 0.2 g of diisopropylperoxy dicarbonate powder ((($CH_3$)$_2$CHOCOO)$_2$) as a polymerization initiator, were introduced into a pressure resistant glass autoclave having an internal capacity of 1 L. The interior of the system was replaced three times with nitrogen, and then, suspension polymerization was carried out at 40° C. for 23 hours. As a result, 40 g of polymer A1 was obtained. The infrared absorption spectrum of this polymer was measured, whereby absorption in the vicinity of 1,660 $cm^{-1}$ or 1,840 $cm^{-1}$ attributable to the double bond present in the monomer, was not detected.

Polymer A1 was subjected to heat treatment at 250° C. for 8 hours in air and then immersed in water to obtain polymer A2 having —COOH groups as terminal groups. The infrared absorption spectrum of a compression-molded film of the polymer was measured, whereby the characteristic absorption at 1,775 and 1,810 $cm^{-1}$ attributable to —COOH groups was observed. Further, the intrinsic viscosity [η](30° C.) of this polymer was 0.24 dl/g.

The volume resistivity of polymer A2 was >$10^{17}$ Ωcm, the dielectric breakdown voltage was 19 kV/mm, and the relative dielectric constant was 2.1.

With respect to polymer A2, the differential scanning calorimetery (DSC) was carried out, whereby the glass transition temperature (Tg) of polymer A2 was 108° C.

In a perfluorotributylamine, the above polymer A2 was dissolved at a concentration of 15 mass % to obtain a polymer solution P1.

(2) Incorporation of Silane Coupling Agent

A solution having 10.6 g of perfluorotributylamine added to 84.6 g of the above polymer solution P1, and a silane coupling agent solution having 0.4 g of γ-aminopropylmethyldiethoxysilane dissolved in 4.7 g of 2-(perfluorohexyl)ethanol, were mixed to obtain a uniform polymer composition solution M1.

Example 1

Production of Electret A

On a silicon substrate of 3 cm×3 cm having a thickness of 350 μm, the polymer composition solution M1 was applied by a spin coating method and dried by baking at 200° C. to form a coating film having a thickness of 10 μm (hereinafter referred to as a coating film A). Then, $N_2$ plasma treatment was applied on the surface of this coating film A by using REACTIVE ION ETCHING SYSTEM RIE-10NR manufactured by SAMCO International, Inc. Then, on the coating film A, an N-methylpyrrolidone (NMP) solution containing 12 mass % of a polyamic acid (Semicofine SP483, manufactured by Toray Industries, Inc., relative dielectric constant after polyimidation: 3.75, glass transition temperature: at least 350° C.) was applied by a spin coating method, followed by heat treatment at 200° C. for 5 hours for polyimidation thereby to obtain a laminate film A having a total film thickness of 15 μm [double layered laminate having 10 μm of layer (A)/5 μm of layer (B) laminated in this order from the substrate side].

To the obtained laminate film A, electric charge was injected by corona discharge to obtain an electret A. The injection of electric charge was carried out by using a corona charging equipment, of which a schematic construction diagram is shown in FIG. 1, by the following procedure under a condition of 120° C. at a charging voltage of −8 kV for a charging time of 3 minutes. That is, by using a substrate (a silicon substrate in this Example) (10) as an electrode, a high voltage of −8 kV was applied between a corona needle (14) and the substrate (10) by a DC high voltage power source (12) (HAR-20R5, manufactured by Matsusada Precision Inc.) to inject electric charge to the laminate (11) formed on the substrate (10). In this corona charging equipment, negative ions discharged from the corona needle (14) are homogenized by a grid (16) and then showered down on the laminate (11), whereby electric charge is injected. Here, to the grid (16), a voltage of −600 V is applied from the power source (18) for grid.

Example 2

Production of Electret B

On a silicon substrate of 3 cm×3 cm having a thickness of 350 μm, a coating film A having a thickness of 14 μm was formed in the same manner as in Example 1. Then, on the surface of the coating film A, $N_2$ plasma treatment was carried out by the same procedure as in Example 1. Then, in the same manner as in Example 1, on the coating film A, a polyimide film was formed in a film thickness of 1 μm to obtain a laminate film B having a total film thickness of 15 μm [double layered laminate having 14 μm of layer (A)/1 μm of layer (B) laminated in this order from the substrate side].

To the obtained laminate film B, electric charge was injected by the same procedure as in Example 1 to obtain an electret B.

Example 3

Production of Electret C

On a silicon substrate of 3 cm×3 cm having a thickness of 350 μm, a coating film A having a thickness of 10 μm was formed in the same manner as in Example 1. Then, on this coating film A, a polyparaxylylene resin (Parylene C, manufactured by Parylene Japan, relative dielectric constant: 2.95, glass transition temperature: 87 to 97° C.) was chemically vapor-deposited by a CVD method to form a film, thereby to obtain a laminate film C having a total film thickness of 15 μm [double layered laminate having 10 μm of layer (A)/5 μm of layer (B) laminated in this order from the substrate side].

To this laminate film C, electric charge was injected by the same procedure as in Example 1 to obtain an electret C.

Example 4

Production of Electret D

On a silicon substrate of 3 cm×3 cm having a thickness of 350 μm, a coating film A having a thickness of 13 μm was formed in the same manner as in Example 1. Then, on the surface of this coating film A, $N_2$ plasma treatment was carried out by the same procedure as in Example 1. Then, a xylene solution containing 20 mass % of polysilazane (DEN-3, manufactured by Clariant) was applied by a spin coating method, followed by baking at 200° C. for 12 hours to form a silicon oxide film (relative dielectric constant after baking: 2.6) on the coating film A thereby to obtain a laminate film D having a total film thickness of 15 μm [double layered laminate having 13 μm of layer (A)/2 μm of layer (B) laminated in this order from the substrate side].

To this laminate film D, electric charge was injected by the same procedure as in Example 1 to obtain an electret D.

Comparative Example 1

Production of Electret E

On a silicon substrate of 3 cm×3 cm having a thickness of 350 μm, a coating film A having a thickness of 14.5 μm was formed in the same manner as in Example 1. Then, on the surface of the coating film A, $N_2$ plasma treatment was carried out by the same procedure as in Example 1. Then, in the same manner as in Example 1, a polyimide film was formed on the coating film A to obtain a laminate film E having a total film thickness of 15 μm [double layered laminate having 14.5 μm of layer (A)/0.5 μm of layer (B) laminated in this order from the substrate side].

To this laminate film E, electric charge was injected by the same procedure as in Example 1 to obtain an electret E.

Comparative Example 2

Production of Electret F

On a silicon substrate of 3 cm×3 cm having a thickness of 350 μm, a coating film A having a thickness of 10 μm was formed in the same manner as in Example 1. Then, on the surface of the coating film A, $N_2$ plasma treatment was carried out by the same procedure as in Example 1. Then, a m-xylene solution containing 15 mass % of a cycloolefin polymer (ZEON EX480, manufactured by ZEON CORPORATION, relative dielectric constant: 2.3, glass transition temperature: 138° C.) was applied by a spin coating method, followed by drying by baking at 160° C. for one hour to obtain a laminate film F having a total film thickness of 15 μm [double layered laminate having 10 μm of layer (A)/5 μm of layer (B) laminated in this order from the substrate side].

To this laminate film F, electric charge was injected by the same procedure as in Example 1 to obtain an electret F.

Example 5

Production of Electret G

On a silicon substrate of 3 cm×3 cm having a thickness of 350 μm, a coating film A having a thickness of 7 μm was formed in the same manner as in Example 1. Then, on the surface of the coating film A, $N_2$ plasma treatment was carried out by the same procedure as in Example 1. Then, in the same manner as in Example 1, a polyimide film was formed in a thickness of 2 μm on the coating film A to obtain a laminate film having a total film thickness of 9 μm. Further, on this laminate film, the polymer composition solution M1 was applied by a spin coating method, followed by drying by baking at 200° C. to obtain a laminate film G having a total film thickness of 15 μm [three-layered laminate having 7 μm of layer (A)/2 μm of layer (B)/6 μm of layer (A) laminated in this order from the substrate side].

To this laminate film G, electric charge was injected by the same procedure as in Example 1 to obtain an electret G.

Example 6

Production of Electret H

On a silicon substrate of 3 cm×3 cm having a thickness of 350 μm, a coating film A having a thickness of 7 μm was formed in the same manner as in Example 1. Then, on the surface of the coating film A, $N_2$ plasma treatment was carried out by the same procedure as in Example 1. Then, in the same manner as in Example 1, a polyimide film was formed in a thickness of 2 μm on the coating film A to obtain a laminate film having a total film thickness of 9 μm. Further, on the laminate film, the polymer composition solution M1 was applied by a spin coating method, followed by drying by baking at 200° C. to obtain a laminate film having a total film thickness of 13 μm. Further, on the surface of the laminate film, $N_2$ plasma treatment was carried out by the same procedure as in Example 1, and in the same manner as in Example 1, a polyimide film was formed in a thickness of 2 μm thereon to obtain a laminate film H having a total film thickness of 15 μm [four-layered laminate having 7 μm of layer (A)/2 μm of layer (B)/4 μm of layer (A)/2 μm of layer (B) laminated in this order from the substrate side].

To this laminate film H, electric charge was injected by the same procedure as in Example 1 to obtain an electret H.

Comparative Example 3

Production of Electret I

On a silicon substrate of 3 cm×3 cm having a thickness of 350 μm, a coating film A having a thickness of 15 μm was formed in the same manner as in Example 1 and designated as a coating film I.

To this coating film I, electric charge was injected by the same procedure as in Example 1 to obtain an electret I.

Test Example 1

Charging Test

With respect to the electrets A to I obtained as described above, charging tests were carried out by the following procedure.

The electrets A to I immediately after injecting electric charge by corona charging under conditions of a charging voltage of −8 kV and a charging time of 3 minutes, were, respectively, returned to room temperature (25° C.), and their surface voltages (initial surface voltages) and surface charge densities (initial surface charge densities) were measured. Further, the respective electrets were stored for 200 hours under conditions of 20° C. and 60% RH and then returned to room temperature, and their surface voltages (surface voltages after 200 hours) and surface charge densities (surface charge densities after 200 hours) were measured. The results are shown in Table 1.

Figure 2:
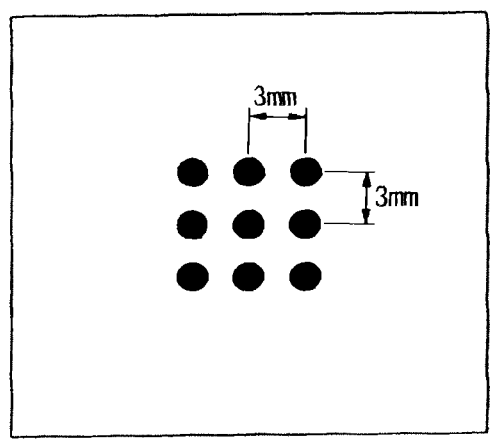
FIG. 2 is a diagram showing set positions for measuring points for surface voltages.

The surface voltage (V) was obtained by measuring surface voltages at 9 measuring points (set in a lattice arrangement for every 3 mm from the center of the film, as shown in FIG. 2) of each electret by using a surface voltmeter (model 279, manufactured by Monroe Electronics Inc.), and taking their average value. The surface charge density $\sigma$(mC/m$^2$) was obtained by using the following formulae.

<In the Case of Double-Layered Film>

$$\sigma = \epsilon_0 V/[(d_1/\epsilon_{r1})+(d_2/\epsilon_{r2})]$$

wherein $\epsilon_0$: dielectric constant in vacuum, $\epsilon_{r1}$, $\epsilon_{r2}$: relative dielectric constants of the respective layers, V: surface voltage (V), $d_1$, $d_2$: sum (m) of thicknesses of the respective layers.

<In the Case of Single Layered Film>

$$\sigma = \epsilon_r \epsilon_0 V/d$$

wherein $\epsilon_0$: dielectric constant in vacuum, $\epsilon_{r0}$: relative dielectric constant of the single layer, V: surface voltage (V), d: film thickness (m) of single layer.

TABLE 1

| Electret | Relative dielectric constant of layer (B) | Film thickness of layer (B) (μm) | Difference in relative dielectric constant | Surface voltage (V) Initial | Surface voltage (V) After 200 hours | Surface charge density (mC/m$^2$) Initial | Surface charge density (mC/m$^2$) After 200 hours |
|---|---|---|---|---|---|---|---|
| A | 3.75 | 5 | 1.65 | −2.265 | −1.863 | −3.376 | −2.777 |
| B | 3.75 | 1 | 1.65 | −1.694 | −1.674 | −2.085 | −2.060 |
| C | 2.95 | 5 | 0.85 | −2.270 | −2.086 | −3.120 | −2.867 |
| D | 2.6 | 2 | 0.5 | −1.669 | −1.542 | −1.774 | −1.639 |
| E | 3.75 | 0.5 | 1.65 | −1.205 | −1.170 | −1.512 | −1.468 |
| F | 2.3 | 5 | 0.2 | −1.306 | −1.256 | −1.595 | −1.534 |
| G | 3.75 | 2 | 1.65 | −1.407 | −1.372 | −1.785 | −1.741 |
| H | 3.75 | 2 | 1.65 | −1.697 | −1.559 | −2.395 | −2.200 |
| I | — | — | — | −1.277 | −1.274 | −1.583 | −1.579 |

From the results in Table 1, judging from the surface voltages and surface charge densities at the initial stage and after 200 hours, electrets A to D, G and H showed an improvement in the surface voltage and surface charge density, as compared with electrets E, F and I. Further, these values were found to be higher as the difference in the relative dielectric constant was larger.

INDUSTRIAL APPLICABILITY

The electret of the present invention is capable of increasing the surface charge density and has a high surface voltage, and an electrostatic induction conversion device using such an electret has an improved efficiency for conversion between electric energy and kinetic energy and thus is useful for e.g. a vibration type power generator, an actuator, a censor, etc. having excellent performance.

The entire disclosure of Japanese Patent Application No. 2008-082532 filed on Mar. 27, 2008 including specification, claims, drawings and summary is incorporated herein by reference in its entirety.

What is claimed is:

1. An electret comprising a laminate wherein a layer (A) containing a polymer compound (a) having a relative dielectric constant of from 1.8 to 3.0 and a layer (B) containing a polymer compound (b) having a relative dielectric constant higher than the polymer compound (a) are directly laminated, wherein the difference between the relative dielectric constant of the polymer compound (b) and the relative dielectric constant of the polymer compound (a) is at least 0.3; the layer (A) is disposed on the outermost surface on a side opposite to the side where electric charge is injected at the time of injecting electric charge into the laminate to form the electret; and the layer (B) has a thickness of at least 1 μm;
wherein the polymer compound (a) is a fluorinated polymer having an alicyclic structure, wherein the fluorinated polymer is at least one member selected from the list consisting of: (i) a polymer having a unit based on a cyclic fluorinated monomer, and (ii) a polymer having a unit formed by cyclopolymerization of a diene type fluorinated monomer;
wherein the layer (A) consists essentially of the polymer compound (a) and a silane coupling agent; and
wherein the polymer compound (b) is at least one member selected from the group consisting of: a polyimide, a polyparaxylylene resin, a polycarbonate, a polyarylene, a polyarylene ether, a polyether sulfone, and a polysulfone.

2. The electret according to claim 1, wherein the polymer compound (b) has a glass transition temperature or melting point of at least 80° C.

3. The electret according to claim 1, wherein the laminate is a ($n_A+n_B$) layered laminate wherein $n_A$ layers of layer A and $n_B$ layers of layer B are alternately laminated, wherein $n_A$ is an integer of from 1 to 5, $n_B$ is an integer of from 1 to 5, and the value of $n_A-n_B$ is 0 or 1.

4. An electrostatic induction conversion device comprising the electret as defined in claim 1.

5. The electret according to claim 1, wherein the laminate is selected from the group consisting of:
a laminate comprising a substrate, a layer (A) disposed on and in direct contact with the substrate, and layer (B) disposed on and in direct contact with layer (A);
a laminate comprising a substrate, with layer (A) disposed on and in direct contact with the substrate, and layer (B) disposed on and in direct contact with layer (A), and a layer (A') physically separated from and made of the same material as layer (A) and disposed on and in direct contact with layer (B); and
a laminate comprising a substrate, with layer (A) disposed on and in direct contact with the substrate, and layer (B) disposed on and in direct contact with layer (A), a layer (A') physically separated from and made of the same material as later (A) and disposed on and in direct contact with layer (B), and a layer (B') physically separated from and made of the same material as layer (B) and disposed on and in direct contact with layer (A').

6. The electret according to claim 5, wherein the laminate comprises at least one member selected from the group consisting of: gold, platinum, copper, aluminum, chromium, nickel, glass, polyethylene terephthalate, polyimide, polycarbonate, an acrylic resin and silicon.

7. The electret according to claim 1, wherein the polymer compound (a) is a fluorinated polymer that is (i) a polymer having a unit based on a cyclic fluorinated monomer, and wherein the cyclic fluorinated monomer is at least one member selected from the list consisting of:

a monomer having a polymerizable double bond between carbon atoms constituting a fluorinated alicyclic ring, and a monomer having a polymerizable double bond between a carbon atom, constituting a fluorinated alicyclic ring and a carbon atom of other than a fluorinated alicyclic ring.

8. The electret according to claim 7, wherein the cyclic fluorinated monomer comprises a compound of the formula:

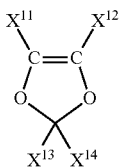

wherein $X^{11}$, $X^{12}$, $X^{13}$, $X^{14}$, are independent of one another, and each is at least one member selected from the group consisting of: a fluorine atom, a perfluoroalkyl group, and a perfluoroalkoxy group.

9. The electret according to claim 7, wherein the cyclic fluorinated monomer comprises a compound of the formula:

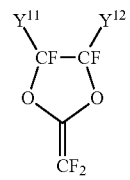

wherein $Y^{11}$ and $Y^{12}$ are independent of one another, and each is at least one member selected from the group consisting of: a fluorine atom, a perfluoroalkyl group, and a perfluoroalkoxy group.

10. The electret according to claim 1, wherein the polymer compound (a) is a fluorinated polymer that is (ii) a polymer having a unit formed by cyclopolymerization of a diene type fluorinated monomer, wherein the diene type fluorinated monomer comprises a compound of the formula:

$$CF_2=CF-Q-CF=CF_2$$

wherein Q is a $C_{1-3}$ perfluoroalkylene group.

11. The electret according to claim 10, wherein Q is a $C_{1-3}$ perfluoroalkylene group having an etheric oxygen atom.

12. The electret according to claim 10, wherein Q is a $C_{1-3}$ perfluoroalkylene group wherein one or more fluorine atoms are substituted by halogen atoms other than fluorine atoms.

13. The electret according to claim 1, wherein the polymer compound (a) has a carboxyl group at a terminal of a main chain or at a side chain.

\* \* \* \* \*